United States Patent
Conrad et al.

(10) Patent No.: US 12,380,749 B2
(45) Date of Patent: Aug. 5, 2025

(54) ELECTRONIC LOCK SYSTEM

(71) Applicant: Master Lock Company LLC, Oak Creek, WI (US)

(72) Inventors: Nathan Conrad, Oak Creek, WI (US); Yi Zhang, Oak Creek, WI (US); Nemanja Stefanovic, Oak Creek, WI (US); John Bartucci, Crystal Lake, IL (US); Scott Kalous, Kenosha, WI (US)

(73) Assignee: Master Lock Company LLC, Oak Creek, WI (US)

( * ) Notice: Subject to any disclaimer, the term of this patent is extended or adjusted under 35 U.S.C. 154(b) by 0 days.

(21) Appl. No.: 18/656,319

(22) Filed: May 6, 2024

(65) Prior Publication Data

US 2024/0404337 A1    Dec. 5, 2024

Related U.S. Application Data

(63) Continuation of application No. 17/963,020, filed on Oct. 10, 2022, now Pat. No. 12,008,850, which is a
(Continued)

(51) Int. Cl.
*G07C 9/00* (2020.01)
*H04W 12/04* (2021.01)
(Continued)

(52) U.S. Cl.
CPC ..... *G07C 9/00309* (2013.01); *G07C 9/00571* (2013.01); *H04W 12/04* (2013.01);
(Continued)

(58) Field of Classification Search
USPC ...................................................... 713/185
See application file for complete search history.

(56) References Cited

U.S. PATENT DOCUMENTS

| | | |
|---|---|---|
| 5,245,652 A | 9/1993 | Larson et al. |
| 5,565,858 A | 10/1996 | Guthrie |

(Continued)

FOREIGN PATENT DOCUMENTS

| | | |
|---|---|---|
| CN | 1416493 | 5/2003 |
| CN | 101029546 | 9/2007 |

(Continued)

OTHER PUBLICATIONS

Chinese First Office Action (with English Translation) on Chinese Application No. 201680070395.X dated Jun. 3, 2020.
(Continued)

*Primary Examiner* — Sakinah White Taylor
(74) *Attorney, Agent, or Firm* — Foley & Lardner LLP

(57) ABSTRACT

A system includes a server having a communication device and a processing circuit. The communication device is configured to facilitate communication with electronic devices. The processing circuit is configured to receive permission from a first user device for a guest user to access an electronic lock using a second user device, provide a notification to the second user device regarding a guest user profile, receive an activation command from the second user device based on the notification, generate the guest user profile for the guest user in response to receiving the permission and the activation command, and transmit the guest user profile to the second user device. The guest user profile is usable to allow the guest user to unlock the electronic lock.

17 Claims, 17 Drawing Sheets

Related U.S. Application Data continuation of application No. 17/011,335, filed on Sep. 3, 2020, now Pat. No. 11,468,721, which is a continuation of application No. 16/195,464, filed on Nov. 19, 2018, now Pat. No. 10,771,975, which is a continuation of application No. 15/444,076, filed on Feb. 27, 2017, now Pat. No. 10,142,843, which is a continuation of application No. 14/470,590, filed on Aug. 27, 2014, now Pat. No. 9,600,949, which is a continuation-in-part of application No. 14/447,514, filed on Jul. 30, 2014, now Pat. No. 9,455,839.

(51) Int. Cl.
  *H04W 12/06* (2021.01)
  *H04W 12/08* (2021.01)

(52) U.S. Cl.
  CPC ........... *H04W 12/06* (2013.01); *H04W 12/08* (2013.01); *G07C 2009/00404* (2013.01); *G07C 2009/00412* (2013.01)

(56) References Cited

U.S. PATENT DOCUMENTS

| | | | |
|---|---|---|---|
| 5,648,763 | A | 7/1997 | Long |
| 6,046,558 | A | 4/2000 | Larson et al. |
| 6,047,575 | A | 4/2000 | Larson et al. |
| 6,081,199 | A | 6/2000 | Hogl |
| 6,337,618 | B1 | 1/2002 | Craig et al. |
| 7,183,894 | B2 | 2/2007 | Yui et al. |
| 7,287,695 | B2 | 10/2007 | Wankmueller |
| 7,782,200 | B1 | 8/2010 | Fleischmann |
| 8,533,123 | B2 | 9/2013 | Hart |
| 8,863,241 | B2 | 10/2014 | Ratiner et al. |
| 8,866,639 | B2 | 10/2014 | Kleindienst et al. |
| 8,922,333 | B1 | 12/2014 | Kirkjan |
| 8,925,805 | B2 | 1/2015 | Grigg et al. |
| 8,943,187 | B1 | 1/2015 | Saylor |
| 8,957,757 | B1 | 2/2015 | Le Burge et al. |
| 9,316,454 | B2 | 4/2016 | Milde, Jr. |
| 9,330,514 | B2 | 5/2016 | Kuenzi et al. |
| 9,365,188 | B1 | 6/2016 | Penilla et al. |
| 9,374,654 | B2 * | 6/2016 | Lindeman ............. H04L 67/303 |
| 9,406,180 | B2 | 8/2016 | Eberwine et al. |
| 9,460,480 | B2 | 10/2016 | Woodard et al. |
| 9,508,206 | B2 | 11/2016 | Ahearn et al. |
| 9,600,949 | B2 | 3/2017 | Conrad et al. |
| 9,672,672 | B2 | 6/2017 | Ranchod |
| 10,490,005 | B2 * | 11/2019 | Caterino ................ G07C 9/257 |
| 10,871,023 | B1 * | 12/2020 | Goetz ................... G06Q 20/127 |
| 2002/0099945 | A1 | 7/2002 | McLintock et al. |
| 2002/0180582 | A1 | 12/2002 | Nielsen |
| 2003/0028481 | A1 | 2/2003 | Flitcroft et al. |
| 2003/0102957 | A1 | 6/2003 | Crisp |
| 2003/0179073 | A1 | 9/2003 | Ghazarian |
| 2003/0179075 | A1 | 9/2003 | Greenman |
| 2004/0025039 | A1 | 2/2004 | Kuenzi et al. |
| 2004/0108938 | A1 | 6/2004 | Entrekin |
| 2004/0172535 | A1 | 9/2004 | Jakobsson et al. |
| 2004/0255623 | A1 | 12/2004 | Sun et al. |
| 2004/0260646 | A1 | 12/2004 | Berardi et al. |
| 2005/0044906 | A1 | 3/2005 | Spielman |
| 2005/0088279 | A1 | 4/2005 | Denison et al. |
| 2005/0099262 | A1 | 5/2005 | Childress et al. |
| 2005/0264397 | A1 | 12/2005 | Coelho et al. |
| 2006/0072755 | A1 | 4/2006 | Oskari |
| 2006/0121951 | A1 | 6/2006 | Perdomo et al. |
| 2006/0143600 | A1 | 6/2006 | Cottrell et al. |
| 2006/0250235 | A1 | 11/2006 | Astrin |
| 2006/0255128 | A1 | 11/2006 | Johnson et al. |
| 2006/0288744 | A1 | 12/2006 | Smith |
| 2007/0018787 | A1 | 1/2007 | Martinez de Velasco Cortina et al. |
| 2007/0200671 | A1 | 8/2007 | Kelley et al. |
| 2007/0234052 | A1 | 10/2007 | Campisi |
| 2007/0290793 | A1 | 12/2007 | Tran |
| 2007/0290797 | A1 | 12/2007 | Harkins et al. |
| 2007/0290799 | A1 | 12/2007 | Harkins et al. |
| 2008/0061191 | A1 | 3/2008 | Gochnour |
| 2008/0246587 | A1 | 10/2008 | Fisher |
| 2009/0136035 | A1 | 5/2009 | Lee |
| 2009/0183541 | A1 | 7/2009 | Sadighi et al. |
| 2009/0184801 | A1 | 7/2009 | Bliding et al. |
| 2009/0231093 | A1 | 9/2009 | Keller et al. |
| 2009/0256676 | A1 | 10/2009 | Piccirillo et al. |
| 2009/0271533 | A1 | 10/2009 | Asnaashari |
| 2009/0306888 | A1 | 12/2009 | May et al. |
| 2009/0320538 | A1 | 12/2009 | Pellaton |
| 2010/0073129 | A1 | 3/2010 | Pukari |
| 2010/0075656 | A1 | 3/2010 | Howarter et al. |
| 2010/0266132 | A1 | 10/2010 | Bablani et al. |
| 2010/0283579 | A1 | 11/2010 | Kraus et al. |
| 2011/0050419 | A1 | 3/2011 | Ng et al. |
| 2011/0074543 | A1 * | 3/2011 | Kaczmarz .......... G07C 9/00571<br>340/5.73 |
| 2011/0145564 | A1 | 6/2011 | Moshir et al. |
| 2011/0167488 | A1 | 7/2011 | Roy et al. |
| 2011/0234397 | A1 | 9/2011 | Fetzer et al. |
| 2011/0252233 | A1 | 10/2011 | De Atley et al. |
| 2011/0291803 | A1 | 12/2011 | Bajic et al. |
| 2011/0307394 | A1 | 12/2011 | Rzepecki |
| 2011/0311052 | A1 | 12/2011 | Myers et al. |
| 2012/0001757 | A1 | 1/2012 | Jung et al. |
| 2012/0011366 | A1 | 1/2012 | Denison |
| 2012/0018511 | A1 | 1/2012 | Hammad |
| 2012/0068817 | A1 * | 3/2012 | Fisher ................ G07C 9/00571<br>340/5.61 |
| 2012/0073338 | A1 | 3/2012 | Mohla |
| 2012/0074223 | A1 | 3/2012 | Habraken |
| 2012/0158589 | A1 | 6/2012 | Katzin et al. |
| 2012/0176107 | A1 | 7/2012 | Shrivas et al. |
| 2012/0196571 | A1 * | 8/2012 | Grkov ..................... G06F 3/165<br>455/411 |
| 2012/0222103 | A1 | 8/2012 | Bliding et al. |
| 2012/0227450 | A1 | 9/2012 | Ufkes |
| 2012/0268239 | A1 | 10/2012 | Ljung et al. |
| 2012/0268244 | A1 | 10/2012 | Ljung et al. |
| 2012/0280783 | A1 | 11/2012 | Gerhardt et al. |
| 2012/0280784 | A1 | 11/2012 | Gaviria Velez et al. |
| 2012/0280790 | A1 | 11/2012 | Gerhardt et al. |
| 2012/0298018 | A1 | 11/2012 | McCabe |
| 2013/0017812 | A1 | 1/2013 | Foster |
| 2013/0030997 | A1 | 1/2013 | Spodak et al. |
| 2013/0031375 | A1 | 1/2013 | Lin |
| 2013/0036781 | A1 | 2/2013 | Hartmann et al. |
| 2013/0043973 | A1 | 2/2013 | Greisen et al. |
| 2013/0054336 | A1 | 2/2013 | Graylin |
| 2013/0099862 | A1 | 4/2013 | Yu et al. |
| 2013/0099892 | A1 | 4/2013 | Tucker et al. |
| 2013/0125231 | A1 | 5/2013 | Kuenzi |
| 2013/0127593 | A1 | 5/2013 | Kuenzi et al. |
| 2013/0139561 | A1 | 6/2013 | Parto et al. |
| 2013/0145454 | A1 * | 6/2013 | Yoshizawa ............... G06F 21/00<br>726/16 |
| 2013/0159704 | A1 | 6/2013 | Chandrasekaran |
| 2013/0168450 | A1 | 7/2013 | Von Mueller et al. |
| 2013/0176107 | A1 | 7/2013 | Dumas et al. |
| 2013/0200999 | A1 | 8/2013 | Spodak et al. |
| 2013/0237193 | A1 | 9/2013 | Dumas et al. |
| 2013/0244684 | A1 | 9/2013 | Kadous et al. |
| 2013/0255335 | A1 | 10/2013 | Jonely |
| 2013/0293368 | A1 | 11/2013 | Ottah et al. |
| 2013/0311764 | A1 | 11/2013 | Alpert et al. |
| 2013/0318519 | A1 | 11/2013 | Coolidge |
| 2013/0325521 | A1 | 12/2013 | Jameel et al. |
| 2013/0332370 | A1 | 12/2013 | Hyde et al. |
| 2013/0335193 | A1 | 12/2013 | Hanson et al. |
| 2013/0342314 | A1 | 12/2013 | Chen et al. |
| 2014/0033774 | A1 | 2/2014 | Ofchus et al. |
| 2014/0040139 | A1 | 2/2014 | Brudnicki et al. |
| 2014/0049361 | A1 | 2/2014 | Ahearn et al. |
| 2014/0049363 | A1 | 2/2014 | Ahearn et al. |
| 2014/0049367 | A1 | 2/2014 | Ahearn et al. |

(56) References Cited

U.S. PATENT DOCUMENTS

| | | |
|---|---|---|
| 2014/0049368 A1 | 2/2014 | Ahearn et al. |
| 2014/0049369 A1 | 2/2014 | Ahearn et al. |
| 2014/0051355 A1 | 2/2014 | Ahearn et al. |
| 2014/0107196 A1 | 4/2014 | Sagar et al. |
| 2014/0120905 A1 | 5/2014 | Kim |
| 2014/0150502 A1 | 6/2014 | Duncan |
| 2014/0151079 A1 | 6/2014 | Furui et al. |
| 2014/0162600 A1 | 6/2014 | Chang et al. |
| 2014/0208114 A1 | 7/2014 | Sopco et al. |
| 2014/0215882 A1 | 8/2014 | Milde, Jr. |
| 2014/0218167 A1 | 8/2014 | Tseng |
| 2014/0232524 A1 | 8/2014 | Nakai et al. |
| 2014/0250954 A1 | 9/2014 | Buzhardt |
| 2014/0266586 A1 | 9/2014 | Fisher et al. |
| 2014/0266588 A1 | 9/2014 | Majzoobi |
| 2014/0289796 A1 | 9/2014 | Moloian et al. |
| 2014/0360232 A1* | 12/2014 | Al-Kahwati ....... G07C 9/00571 70/14 |
| 2014/0375422 A1 | 12/2014 | Huber et al. |
| 2014/0380055 A1 | 12/2014 | Blanchard et al. |
| 2015/0022315 A1 | 1/2015 | Ng et al. |
| 2015/0032627 A1 | 1/2015 | Dill et al. |
| 2015/0067792 A1 | 3/2015 | Benoit et al. |
| 2015/0102902 A1 | 4/2015 | Chen |
| 2015/0134540 A1 | 5/2015 | Law et al. |
| 2015/0170447 A1 | 6/2015 | Buzhardt |
| 2015/0170448 A1 | 6/2015 | Robfogel et al. |
| 2015/0184963 A1 | 7/2015 | Milde, Jr. |
| 2015/0200925 A1 | 7/2015 | Lagerstedt et al. |
| 2015/0213658 A1 | 7/2015 | Dumas et al. |
| 2015/0221152 A1 | 8/2015 | Andersen |
| 2015/0264554 A1* | 9/2015 | Addepalli ............. H04W 76/45 370/328 |
| 2015/0292244 A1 | 10/2015 | Beatty |
| 2015/0312531 A1 | 10/2015 | Samad et al. |
| 2015/0332533 A1 | 11/2015 | Meganck |
| 2015/0356797 A1 | 12/2015 | McBride et al. |
| 2016/0013934 A1 | 1/2016 | Smereka et al. |
| 2016/0033222 A1 | 2/2016 | Milde, Jr. |
| 2016/0035163 A1 | 2/2016 | Conrad et al. |
| 2016/0036788 A1 | 2/2016 | Conrad et al. |
| 2016/0036814 A1 | 2/2016 | Conrad et al. |
| 2016/0049026 A1 | 2/2016 | Johnson |
| 2016/0049032 A1 | 2/2016 | Ranchod |
| 2016/0077159 A1 | 3/2016 | Petrucelli |
| 2016/0116510 A1 | 4/2016 | Kalous et al. |
| 2017/0030109 A1 | 2/2017 | Duncan et al. |
| 2017/0050617 A1* | 2/2017 | Penilla ................ B60R 25/2018 |
| 2017/0366342 A1 | 12/2017 | Gehrmann |
| 2020/0043271 A1 | 2/2020 | Anderson et al. |
| 2020/0329136 A1 | 10/2020 | Gerhardt et al. |
| 2024/0233467 A1* | 7/2024 | Kuenzi ............. G07C 9/00571 |
| 2024/0373205 A1* | 11/2024 | Barqawi ................. H04W 4/90 |

FOREIGN PATENT DOCUMENTS

| | | | |
|---|---|---|---|
| CN | 101437006 A | | 5/2009 |
| CN | 101990196 | | 3/2011 |
| CN | 102084370 A | | 6/2011 |
| CN | 103026682 A | | 4/2013 |
| CN | 203084738 U | * | 7/2013 |
| CN | 104520870 | | 4/2015 |
| EP | 1 369 765 A2 | | 12/2003 |
| EP | 2 273 719 A2 | | 1/2011 |
| JP | 2006-275922 A | | 10/2006 |
| JP | 2010-089850 A | | 4/2010 |
| JP | 2012-526223 A | | 10/2012 |
| JP | 2017-504156 A | | 2/2017 |
| WO | WO-2006/115984 A2 | | 11/2006 |
| WO | WO-2010/151902 A1 | | 12/2010 |
| WO | WO-2013/169887 A1 | | 11/2013 |
| WO | WO-2014/0007870 A1 | | 1/2014 |
| WO | WO-2014/107196 A1 | | 7/2014 |

OTHER PUBLICATIONS

Chinese Office Action, App. No. 201580049324.7, Aug. 28, 2019.
Chinese Office Action, App. No. 201580049331.7, Jun. 3, 2019.
Examination Report No. 1 for Innovation Patent Application No. 2017100542, Dated Aug. 8, 2017.
Examination Report received for Australian Application No. 2015296492, Master Lock Company LLC, Nov. 13, 2018.
Extended European Search Report, App. No. 15827465.4, Master Lock Company LL, 10 pages, Feb. 21, 2018.
Extended European Search Report, App. No. 16856164.5, Apr. 29, 2019.
Final Office Action on U.S. Appl. No. 15/444,076 DTD Apr. 10, 2018.
Final Office Action on U.S. Appl. No. 16/293,507 DTD Oct. 18, 2019.
Final Office Action on U.S. Appl. No. 17/011,335 DTD May 10, 2022.
Final Office Action on U.S. Appl. No. 17/963,020 DTD Nov. 24, 2023.
Foreign Action other than Search Report on AU 2015296491 DTD Nov. 19, 2018.
Foreign Action other than Search Report on EP 15826512.4 DTD Jul. 18, 2019.
Foreign Action other than Search Report on MX MX/a/2017/001088 DTD Sep. 26, 2018.
Foreign Search Report on EP 15826512.4 dated Mar. 2, 2018.
International Preliminary Report on Patentability issued on PCT Application No. PCT/US2018/056781 dated Apr. 17, 2018 (9 pages).
International Preliminary Report on Patentability, PCT/US2015/042743, Master Lock Company LLC, 10 pages, Feb. 9, 2017.
International Preliminary Report on Patentability, PCT/US2015/042745, Master Lock Company LLC, 9 pages, Feb. 9, 2017.
International Search Report and Written Opinion, PCT/US2015/042743, Master Lock Company LLC, 15 pages, Dec. 28, 2015.
International Search Report and Written Opinion, PCT/US2015/042745, Master Lock Company LLC, 10 pages, Nov. 2, 2015.
International Search Report and Written Opinion, PCT/US2015/057402, Master Lock Company LLC, 10 pages, Feb. 18, 2016.
International Search Report and Written Opinion, PCT/US2016/056781, Master Lock Company LLC, 11 pages, Nov. 4, 2016.
Non-Final Office Action on U.S. Appl. No. 16/293,507 DTD Apr. 3, 2019.
Non-Final Office Action on U.S. Appl. No. 17/963,020 DTD Jun. 26, 2023.
Notice of Allowance on U.S. Appl. No. 15/444,076 DTD Jul. 12, 2018.
Notice of Allowance on U.S. Appl. No. 15/587,034 DTD Feb. 11, 2019.
Notice of Allowance on U.S. Appl. No. 15/587,034 DTD Dec. 5, 2018.
Notice of Allowance on U.S. Appl. No. 15/846,078 DTD Jun. 8, 2018.
Notice of Allowance on U.S. Appl. No. 15/894,357 DTD Nov. 6, 2019.
Notice of Allowance on U.S. Appl. No. 16/195,464 DTD Feb. 27, 2020.
Notice of Allowance on U.S. Appl. No. 16/195,464 DTD Jun. 26, 2020.
Notice of Allowance on U.S. Appl. No. 17/011,335 DTD Jun. 8, 2022.
Notice of Allowance on U.S. Appl. No. 17/963,020 DTD Feb. 7, 2024.
Office Action, U.S. Appl. No. 14/447,514, 18 pages, Jan. 21, 2016.
Office Action. U.S. Appl. No. 14/447,489, 17 pages, Mar. 3, 2016.
U.S. Office Action, U.S. Appl. No. 14/470,590, 48 pages, Nov. 4, 2015.
US Notice of Allowance on U.S. Appl. No. 14/447,489 DTD Feb. 9, 2018.
US Notice of Allowance on U.S. Appl. No. 14/447,489 DTD Mar. 30, 2018.
US Notice of Allowance on U.S. Appl. No. 14/447,489 DTD May 17, 2018.

(56) References Cited

OTHER PUBLICATIONS

US Notice of Allowance on U.S. Appl. No. 14/447,514 DTD May 24, 2016.
US Notice of Allowance on U.S. Appl. No. 14/447,514 DTD Aug. 16, 2016.
US Notice of Allowance on U.S. Appl. No. 14/470,590 DTD Nov. 4, 2016.
US Notice of Allowance on U.S. Appl. No. 14/883,524 DTD Oct. 4, 2017.
US Office Action on U.S. Appl. No. 14/470,590 DTD Nov. 4, 2015.
US Office Action on U.S. Appl. No. 15/587,034 DTD Mar. 22, 2018.
US Office Action on U.S. Appl. No. 14/447,489 DTD Aug. 21, 2017.
US Office Action on U.S. Appl. No. 14/447,489 DTD Oct. 7, 2016.
US Office Action on U.S. Appl. No. 14/447,489 DTD Feb. 9, 2017.
US Office Action on U.S. Appl. No. 14/470,590 DTD May 24, 2016.
US Office Action on U.S. Appl. No. 14/524,558 DTD Feb. 1, 2017.
US Office Action on U.S. Appl. No. 14/524,558 DTD Sep. 18, 2017.
US Office Action on U.S. Appl. No. 14/883,524 DTD Jul. 28, 2016.
US Office Action on U.S. Appl. No. 14/883,524 DTD May 2, 2017.
US Office Action on U.S. Appl. No. 15/444,076 DTD Aug. 25, 2017.
US Office Action on U.S. Appl. No. 15/846,078 DTD Feb. 16, 2018.
US Office Action on U.S. Appl. No. 17/011,335 DTD Jan. 21, 2022.
US Office Acton on U.S. Appl. No. 14/524,558 DTD Sep. 18, 2017.

\* cited by examiner

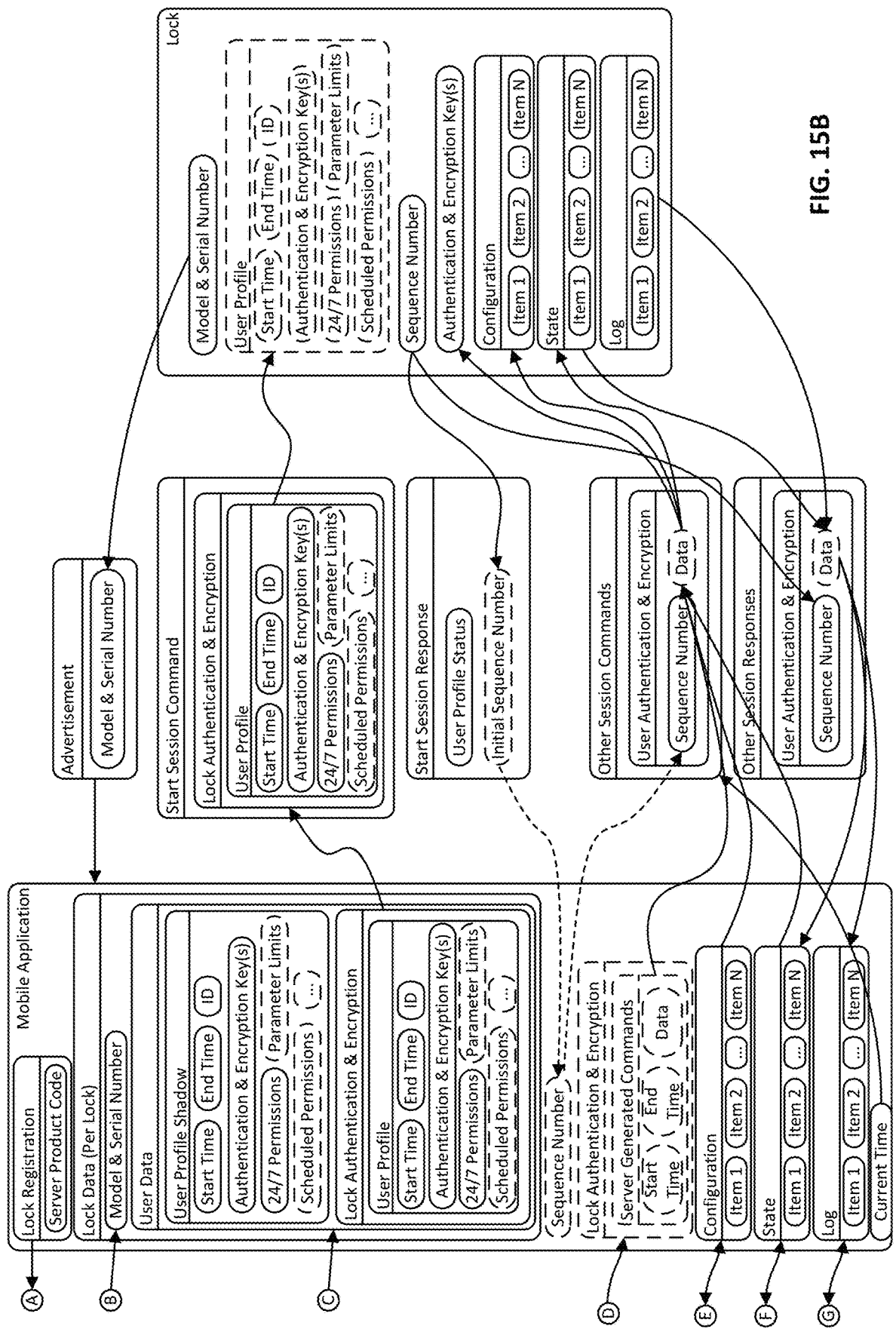

ELECTRONIC LOCK SYSTEM

CROSS-REFERENCE TO RELATED APPLICATIONS

This application is a continuation of U.S. patent application Ser. No. 17/963,020, filed Oct. 10, 2022, which is a continuation of U.S. patent application Ser. No. 17/011,335, filed Sep. 3, 2020, which is a continuation of U.S. patent application Ser. No. 16/195,464, filed Nov. 19, 2018, which is a continuation of U.S. patent application Ser. No. 15/444,076, filed Feb. 27, 2017, which is a continuation of U.S. patent application Ser. No. 14/470,590, filed Aug. 27, 2014, which is a continuation-in-part of U.S. patent application Ser. No. 14/447,514, filed Jul. 30, 2014, all of which are incorporated herein by reference in their entireties.

BACKGROUND

Recently, electronic locks have become commercially available. Such electronic locks may be capable of being controlled by a user device over a wireless connection (e.g., Wi-Fi, etc.). However, the communications that are used to interface with such electronic locks are often not overly secure, which increases the risk that an unauthorized user may gain control of the lock.

SUMMARY

Disclosed herein are methods and devices for wireless key management for authentication. One embodiment relates to a method of authentication. The method comprises: receiving, at a mobile device, a lock identifier from a locking device, the lock identifier associated with the locking device; determining, by the mobile device, that the lock identifier is associated with a user profile on the mobile device by comparing the lock identifier to a set of lock identifiers on the mobile device, wherein a user profile is associated with a lock identifier and is authenticated and encrypted by a server using a lock key that is stored by the server and the locking device, and wherein the user profile comprises a user key; transmitting, by the mobile device, the user profile associated with the lock identifier to the locking device; decrypting, by the locking device, the user profile to generate a decrypted user profile, wherein the user profile is decrypted and verified using the lock key; transmitting, by the locking device, a security code to the mobile device; generating, by the mobile device, an encrypted command, the encrypted command comprising the security code and encrypted using the user key of the user profile; transmitting, by the mobile device, the encrypted command to the locking device; validating, by the locking device, the encrypted command from the mobile device, wherein validating the encrypted command comprises: decrypting the encrypted command using the user key obtained from the decrypted user profile; determining whether the security code is valid; and authenticating the decrypted command using the user key; and initiating, by the locking device in response to validating the command, an action of the locking device as specified by the command.

Another embodiment relates to an electronic locking device. The device comprises: a wireless transceiver; a memory; an electronically controllable locking mechanism; and a processor configured to: store a lock identifier and a lock key in the memory, wherein the lock identifier and the lock key are associated with the electronic locking device; broadcast, via the transceiver, the lock identifier; receive, via the transceiver, an encrypted user profile from a mobile device; authenticate and decrypt the encrypted user profile, wherein the encrypted user profile is authenticated and decrypted using the lock key, and wherein the user profile is encrypted by a server with a copy of the lock key stored by the server and comprises a user key; transmit, via the transceiver, a security code to the mobile device; receive, via the transceiver, an encrypted command from the mobile device; validate the encrypted command, wherein validating the encrypted command comprises: decrypting the encrypted command using the user key from the decrypted user profile; determining whether the security code is valid; and authenticating the decrypted command using the user key; and initiate, in response to validating the command, an action of the electronic locking device as specified by the command.

Another embodiment relates to sharing access to a locking device. The method comprises: receiving, by a server, from a mobile device of the user, a selection of a lock identifier associated with a locking device to share with a mobile device of a guest user from a set of lock identifiers stored on the mobile device of a user; receiving, by the server, a guest user profile request from the mobile device of the user; generating, by the server, an authenticated and encrypted guest user profile based on the guest user profile request and a guest user key, wherein the authenticated and encrypted guest user profile is encrypted using a lock key associated with the locking device and wherein the authenticated and encrypted guest user profile comprises the guest user key; and when the server determines the mobile device of the guest user can access the guest user profile; receiving, by the server, from the mobile device of the user, a selection of the guest user, from a set of users on the mobile device of the user; transmitting, by the server, the authenticated and encrypted guest user profile and the guest user key to the mobile device of the guest user; and adding, by the server, the lock identifier to the set of lock identifiers on the mobile device of the guest user; and when the server determines the mobile device of the guest user cannot access the guest user profile; generating and transmitting, by the server, a message containing a link and code to the mobile device of the guest user; determining, by the server, that the link has been used to allow access to user profiles on the mobile device of the guest user; determining, by the server, that the code has been entered on the mobile device of the guest user; transmitting, by the server, the authenticated and encrypted guest user profile and the guest user key to the mobile device of the guest user; and adding, by the server, the lock identifier to the set of lock identifiers on the mobile device of the guest user.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several implementations in accordance with the disclosure and are, therefore, not to be considered limiting of its scope, the disclosure will be described with additional specificity and detail through use of the accompanying drawings.

FIG. 15 is separated into a first portion FIG. 15A and a second portion FIG. 15B for purposes of readability.

Figure 1:
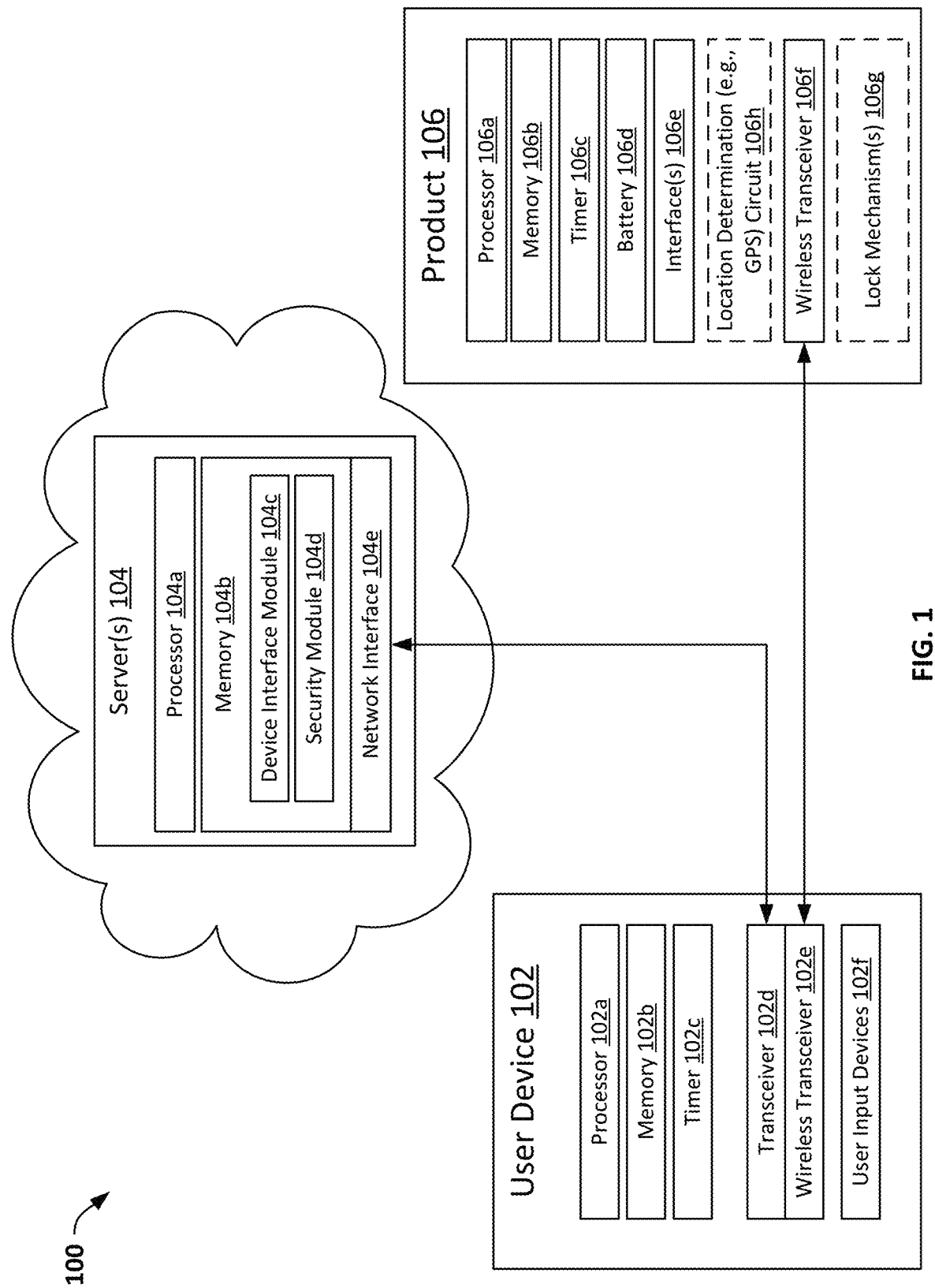
FIG. 1 is a block diagram of a system for wireless key management for authentication, according to an embodiment.

The details of one or more implementations of the subject matter described in this specification are set forth in the accompanying drawings and the description below. Other features, aspects, and advantages of the subject matter will become apparent from the description, the drawings, and the claims.

Like reference numbers and designations in the various drawings indicate like elements. Before turning to the detailed description, which describes the exemplary embodiments in detail, it should be understood that the application is not limited to the details or methodology set forth in the description or illustrated in the figures. It should also be understood that the terminology is for the purpose of description only and should not be regarded as limiting.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

Described herein are techniques for wireless key management for authentication. According to the disclosure herein, additional security is provided to wireless communications between a user device (e.g., a mobile phone, a laptop, a tablet device, etc.) and a product (e.g., an electronic locking device, such as a padlock, door lock, lock box, etc.) via an authentication scheme that utilizes a server and an encryption scheme that uses at least two keys. In scenarios where a user device is configured to control or manage the operation of the product, the use of the disclosed authentication and encryption systems is desirable to ensure that the product is being validly controlled. Throughout this disclosure, embodiments are discussed with reference to a user device of a mobile phone and a product of an electronic locking device. However, the present disclosure is not limited to implementations that use a mobile phone and an electronic locking device, and embodiments that utilize other types of user devices and products are within the scope of this disclosure.

According to some exemplary embodiments, the disclosed approach is based on encryption using two keys. One key (e.g., a secret key) is known/stored on the product (an electronic locking device) and the server (a management system). The other key (e.g., an access key) is known/stored on the lock and the user device (a mobile phone). Both the secret and access keys are specific to the lock/product. In this manner, the secret and access keys may uniquely relate to a single lock/product. The secret key may be used to encrypt a file (e.g., a user profile) that can be used to determine a user's access rights to the lock/product. For example, such access rights may define when a user can remotely access the lock/product or when the user can otherwise control the device (e.g., lock or unlock an electronic locking device). The access key can be used by the user device in initiating communications with the lock/product, and also may be used as part of a challenge-response exchange between the user device and lock/product.

The keys discussed herein may also be used to authenticate that data is valid, and also came from the other holder of the corresponding key. Such data integrity and source authentication/authenticity verification may be performed by computing a MAC (message authentication code) of the data transmitted (e.g., using the secret key or access key). Accordingly, as discussed further herein, when a server encrypts a user profile, a device that receives the encrypted profile (e.g., a locking device) may use its copy of the secret key to verify that the MAC is correct. Similarly, when a lock is transmitting data, it may use its secret key to compute a MAC to be verified by a server (if the data is intended for the server), and the server may use its secret key to verify the MAC. Alternatively, any of the communications discussed herein may be unencrypted (e.g., plaintext packets, etc.), and a MAC may be computed for transmitted data and included with the transmitted data. The MAC may then be used as a security measure to verify that data is being transmitted from a legitimate source. Additionally, when a lock and mobile device are communicating, each may use their copies of the access key to compute a MAC, and each device may verify the data and authenticate its source using the access key. Accordingly, such use of a MAC can ensure that data is coming from the proper source (i.e., the server, mobile device, or the lock), and also that the data is valid.

According to some exemplary embodiments, an approach may allow for secure communication between a user device (e.g., mobile phone) and a product (e.g., lock) using two keys, without both keys being stored on the lock (e.g., during a manufacturing phase). In some such embodiments, one key (e.g., a lock key) is known/stored on the product (an electronic locking device) and the server (a management system), and the other key (e.g., a user key) is known/stored on the user device (a mobile phone) and not on the product. The lock key may be similar or equivalent to the secret key discussed above, and the user key may be similar or equivalent to an access key discussed above. Both the lock and user keys may be specific to the lock/product. In this manner, the lock and user keys may uniquely relate to a single lock/product. The user device may receive a lock identifier and compare it to a list of lock identifiers associated with one or more user profiles on the user device. If a match is found, the user device may transmit the associated user profile to the product. The user profile includes the user key. The product may decrypt the profile and transmit a security code to the user device. The user device may generate a transmit an encrypted command. The encrypted command is encrypted using the user key, and includes the security code. The product may validate the encrypted command using the user key and security code and, assuming the command is validated, initiate the action specified by the command (e.g., unlocking a physical locking component). Some such exemplary embodiments are discussed in further detail below with respect to FIGS. 9 through 15B.

Referring to FIG. 1, a block diagram of a system 100 for wireless key management for authentication is shown, according to an embodiment. System 100 includes at least one user device 102, server 104, and product 106. In an illustrative embodiment, user device 102 is a mobile device (e.g., a mobile phone) and product 106 is an electronic locking device. In general, user device 102 is configured to at least partially manage the operation of product 106. For example, a mobile phone may be used to unlock, lock, and otherwise manage the function of an electronic locking device. User device 102 includes components necessary for such product management (e.g., a processor 102a, memory 102b, timer 102c, transceivers 102d and 102e, user input devices 102f, etc.). Processor 102a may be any commercially available processor, may represent one or more processors, and may be implemented as a general-purpose processor or an application specific integrated circuit. Memory 102b may include the memory of processor 102a (e.g., cache), RAM, or other storage (flash memory, hard disk storage, etc.). Timer 102c is configured to maintain a time value for user device 102. For example, timer 102 may be the clock of processor 102a, or may be any other time keeping circuit of device 102. The time value maintained by timer 102c may be used in secured communications as discussed further herein (e.g., in syncing time with product 106, in providing timestamps related to events for logging purposes, etc.). Transceivers 102d and 102e may include various types of transceivers for different protocols of communication. In one embodiment, transceiver 102d includes cellular components for communicating with server 104 via a cellular network. In one embodiment, transceiver 102d includes wired or wireless (e.g., Wi-Fi) components for communicating with server 104 over the Internet or other network. Wireless transceiver 102e is configured to communicate with product 106. In one embodiment, wireless transceiver 102e includes Bluetooth components for establishing a Bluetooth connection with product 106. User device 102 can manage product 106 through the use of a management application that is configured to run on the user device (e.g., via processor 102a and memory 102b). For example, an app may be installed on a mobile phone (i.e., in the memory 102b of user device 102), and the app may be used to configure and control an electronic locking device (i.e., product 106) over a wireless connection (via wireless transceiver 102e). One or more user input devices 102f (e.g., touch screens, buttons, speakers, displays, keyboards, etc.) may be included in user device 102 to allow a user to interact with device 102, server 104, product 106, and any applications running on the device.

In an embodiment where product 106 is a locking device, such an electronic locking device typically includes a processor 106a for providing logic of the electronic locking device and a high current load (e.g., a motorized locking mechanism 106g that may be controlled by the processor). The high current load may include one or more lock mechanisms 106g (e.g., shackles, pins, memories, etc.) as discussed below. The electronic locking device may also include a battery 106d for powering the high current load and a capacitor in parallel with the processor. The electronic locking device may include one or more physical and/or digital interfaces 106e to allow a user to manage the device (e.g., keypad, touch screen, touch sensitive area, dial, combination lock interface, button, keyhole, etc.) A circuit (e.g., processor 106a) of the electronic padlock may be configured to cause the processor to be powered by the capacitor (and in some embodiments not the battery) while the battery 106d is driving the high current load 106g. In one embodiment, the circuit also includes a timer 106c that is configured to maintain a time value the product, which may be used in secured communications as discussed herein. In one embodiment, the electronic locking device includes a location determination circuit 106h, such as a GPS receiver, that may be used to provide a location of the electronic locking device. In various implementations, location determination circuit 106h may be part of or separate from wireless transceiver 106f. In one embodiment, the electronic locking device is an electronic padlock, such as an electronic combination or keypad padlock. In other embodiments, the electronic locking device may be or include, without limitation, devices such as an electronic door lock or keypad device (e.g., a keypad deadbolt), an electronic safe (e.g., a small document safe, an electronic key safe, etc.), an electronic rim or mortise lock or other type of cabinet lock, an electronic auto accessory lock (e.g., a coupler lock, a hitch pin lock, a trailer lock, etc.) and/or a steering wheel or door lock for an automobile, a vehicle lock (e.g., a wheel lock or ignition lock) for other motorized or non-motorized vehicles such as a bicycle, a motorcycle, a scooter, an ATV, and/or a snowmobile, a storage chest, a case with an electronic lock (e.g., a document case or a case for small valuables), an electronic cable lock (e.g., a cable lock enabled with an alarm, such as for securing a computing device), a safety lockout/tagout device for securing access for safety purposes (e.g., for securing an electrical control box while electrical work is being performed), a locker with an electronic lock, and/or an electronic luggage lock. In one embodiment, the locking device is configured to provide access to secured data (e.g., stored in a memory, etc.) or to store secured data. For example, rather than containing physical locking components (or in addition to physical locking components), lock mechanisms 106g may include a secured memory (e.g., memory 106b may include an encrypted hard drive, etc.). Such a locking device may communicate (e.g., via wireless transceiver 106f) based on the authentication techniques discussed herein. For example, upon authentication, the locking device may use its stored secret key to decrypt secured content that is stored in memory 106b. Decrypted content may then be provided to another device (e.g., via wireless transceiver 106f). In one embodiment, the electronic locking device includes touch detection devices and/or proximity detection devices configured to detect the presence of a user (e.g., based on a user's touch, based on motion of a user, etc.).

Figure 1B:
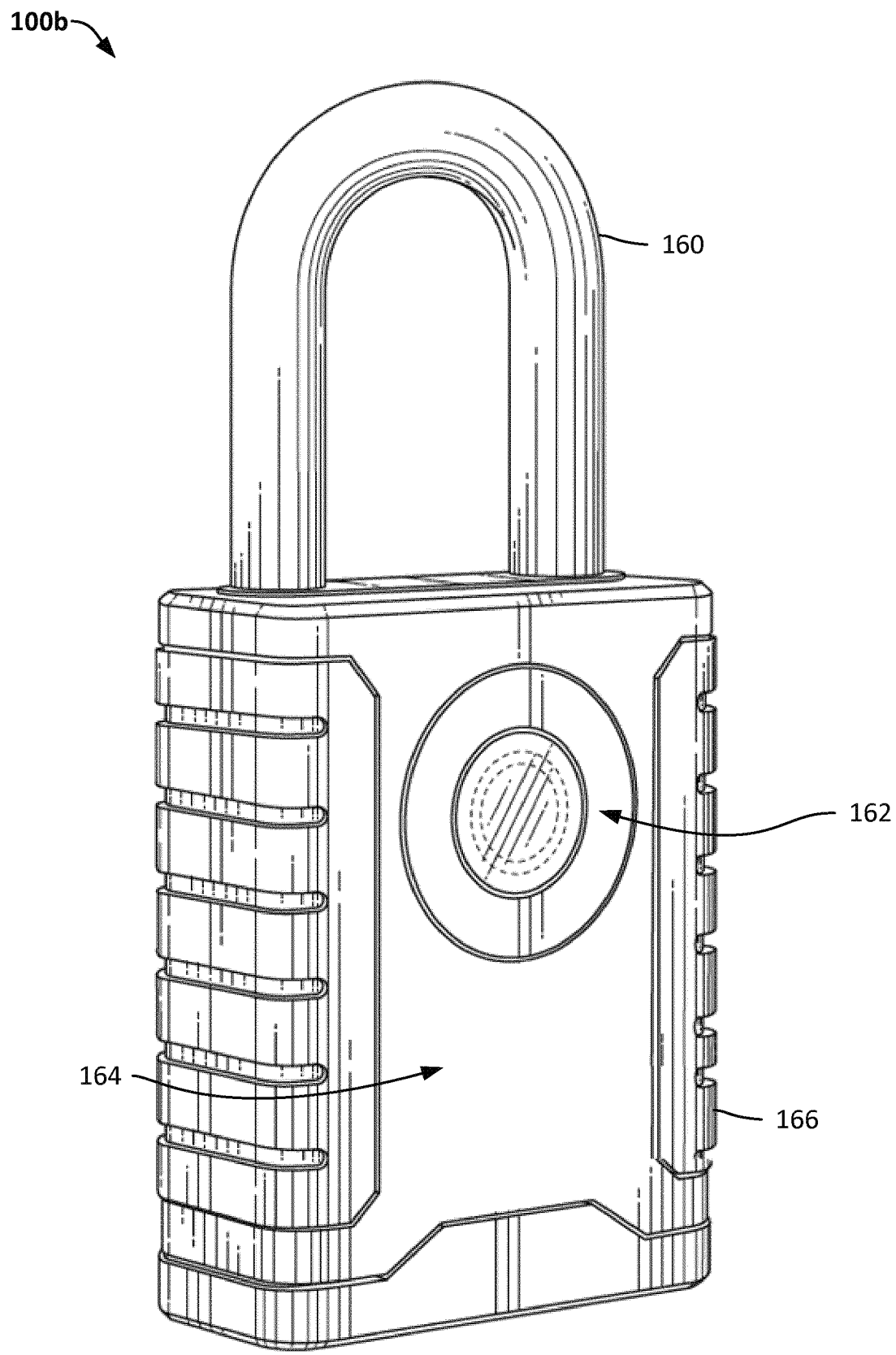
FIG. 1B is a diagram of an example electronic locking device, according to an embodiment.

Referring to FIG. 1B, an example of an electronic locking device 100b is showing, according to one embodiment. Electronic locking device 100b typically includes one or more lock mechanisms (e.g., lock mechanisms 106f). For example, electronic locking device may include shackle 160 an interface 162. In one embodiment, interface 162 includes a touch sensor configured to awake the electronic locking device 100b in response to a user's touch, as is discussed further herein. In one embodiment, interface 162 includes a proximity sensor configured to awake the electronic locking device 100b in response to detecting a nearby user, as is discussed further herein. In one embodiment, interface 162 includes a mechanical dial configured to allow a user to enter a code to the lock (e.g., to unlock shackle 160, etc.). Various processing and mechanical components 164 may be embedded within the case 166 of electronic locking device 100b. For example, the processing and mechanical components 164 may include one or more of the components (e.g., processor 106a, memory 106b, timer 106c, battery 106d, wireless transceiver 106f, lock mechanisms 106g, etc.) discussed with references to product 106 of FIG. 1.

Referring again to FIG. 1, in an illustrative embodiment, product 106 includes a wireless transceiver 106f for communications according to one or more wireless technologies (e.g., radiofrequency, radio frequency identification (RFID), Wi-Fi, Bluetooth, ZigBee, near field communication (NFC), etc.). For example, wireless transceiver 106g may be a Bluetooth transceiver configured to establish a Bluetooth-based connection with user device 102 (e.g., via wireless transceiver 102f). Accordingly, the electronic locking devices discussed herein may be equipped to be locked or unlocked using another user interface device (e.g., user input devices 102f of user device 102, network interface 104e of server 104, etc.), via a wireless transceiver, other than a combination input or keypad input on the lock. For example, wireless communications may be used to lock/unlock/control the electronic locking device wirelessly (e.g., an application on a mobile phone may be used to lock or unlock the device). In one embodiment, the circuit of product 106 also includes an input/output port (e.g., a USB port, a COM port, a networking port, etc.) that may be used to establish a physical connection to another device. For example, such a physical connection may be used by a manufacturer to program or otherwise communicate with product 106.

Server 104 generally includes components (e.g., a processor 104a, memory 104b, network interface 104c, etc.) to communicate with user device 102 and provide authentication keys and encryption functions. Communications between server 104 and user device 102 may be direct or via an intermediate network (e.g., an internet network, a cellular network, etc.). For example, networking interface 104e may include physical network components (e.g., a network card, etc.) configured to allow server 104 to establish a connection to transceiver 102d of device 102. In one embodiment, communications from network interface 104e are routed through a cellular interface, allowing server 104 to communicate with device 102 via a cellular network. In one embodiment, network interface 104e allows server 104 to establish an Internet-based connection with device 102. Server 104 may be one server (a physical or virtual server), or may include multiple servers. Server 104 may include one or more services configured to generate and store keys (e.g., secret key, access key, etc.) used for authentication and encryption. In one embodiment, various modules of memory 104b provide different functions of server 104. For example, a device interface module 104c may be used to establish and manage communications with user device 102. A security module 104d may be used for security related functionality (e.g., generating and storing keys, encrypting a user profile, etc.). The output of security module 104d may be provided to device interface module 104c, such that device interface module may then communicate the security related data to device 102. In one embodiment, an access key and an encrypted user profile may be provided by security module 104d at the request of device interface module 104c. Upon receiving the access key and encrypted user profile, device interface module 104c may transmit (e.g., via a cellular network through network interface 104c) the access key and encrypted user profile to user device 102. In this manner, user device 102 does not directly access security module 104d. In one embodiment, device interface module 104c and security module 104d are located on two separate servers 104.

The following discussion describes embodiments having an electronic locking device (i.e., product 106) and a mobile device (i.e., user device 102). When the lock is manufactured, or soon thereafter, two keys (secret key and access key) can be generated and affiliated with the lock. For example, the secret key and access key may each be related to a unique serial ID or other identification number for the lock, and may be stored in a memory of the lock. In one embodiment, one or both keys are unique and/or randomly generated keys. In one embodiment, a unique code that represents the product is generated (e.g., by server 104) and this unique code can be used to link the lock to its corresponding keys. For example, such a unique code may be secured in product packaging of the lock so that a user may appropriately configure the lock and mobile device. In one embodiment, a separate unique code is provided for each of the security and access keys, and each unique code may be associated with their respective security or access key by the manufacturer. In one embodiment, server 104 also generates the secret and access keys. For example, server 104 may provide a key generation service that may be accessed during the manufacturing process. The keys may be generated according to any generation algorithm; however, the secret key and access key are typically not derived from one another. After generation, the secret is key is only stored on server 104 and the lock. The secret key is not transmitted to the mobile device. However, the access key may be provided to both the lock and the mobile device.

Figure 2:
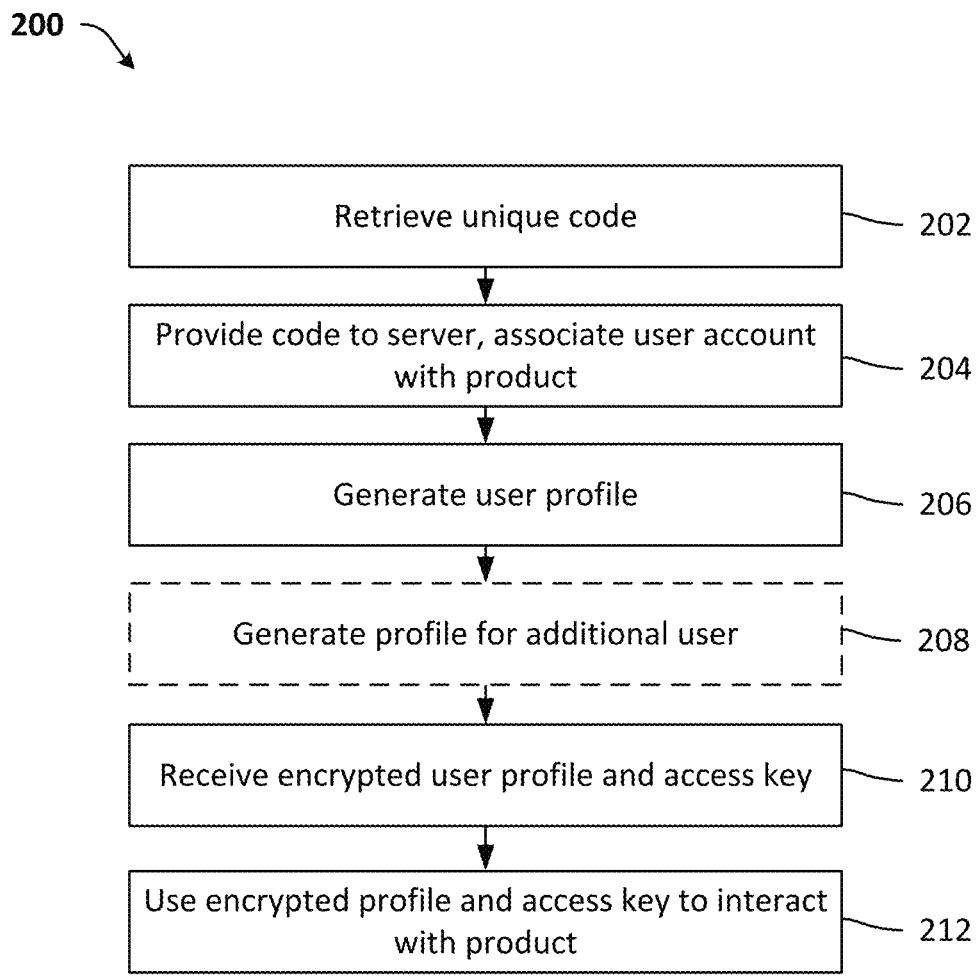
FIG. 2 is a flow diagram of a process for configuring a product and user device, according to an embodiment.

When a user acquires a lock, the user may configure both the lock and the user's mobile device using the unique code that is used to link the lock to its keys. Referring to FIG. 2, a flow diagram of an illustrative process 200 for configuring a product and user device is shown, according to an embodiment. In alternative embodiments, fewer, additional, and/or different steps may be performed. Also, the use of a flow diagram is not meant to be limiting with respect to the order of steps performed.

The unique code is retrieved (202). For example, the user may refer to included product packaging to retrieve the unique code, or the user may otherwise contact a manufacturer to receive the unique code (e.g., via a manufacturer website, phone, etc.). The unique code is then provided to the management server (204) in order to associate the lock with the user. For example, a user may enter the unique code on a user interface of an application running on the mobile device, which then transmits the unique code to the server. In one such example, the user may enter the unique code within a frontend interface provided by the management server and accessed via a browser application on the mobile device. Alternatively, the user may use the mobile device to scan packaging of lock to retrieve and transmit the unique code. For example, the unique code may be encoded by a barcode, QR code, optical code, etc., and a camera of the mobile device may be used to scan and determine the unique code. In response to receiving the unique code from the mobile device, the server can retrieve or newly generate (e.g., on demand) the secret key and access key, which may then be associated with the unique code.

The server may then generate a user profile (206), which may also be associated with the unique code. If a user profile does not yet exist, default values, or values provided by the user via the mobile device may be used to generate the new profile. For example, the user may enter profile data into an application of the mobile device, which transmits the profile data to the server along with the unique code. If the user has already created a profile, the server may instead update the user profile with new values provided by the user via the mobile device.

In general, a user profile may include one or more files that include data related to operation of the product, which is the lock in the above embodiment. For example, a user profile may contain a user schedule of when the lock may be accessed (unlocked, locked, etc.). The schedule may specify lock access permissions, e.g., by day of the week, including starting times (hours, minutes, etc.) and ending times (hours, minutes, etc.) for each corresponding permission. For example, a schedule may specify the time spans in which an electronic lock may be unlocked via the mobile device. As another example, the schedule may specify time periods in which typical interactions are expected to occur, and a level of trust may be determined based on these time periods. Accordingly, an unlock request sent within an expected time period may be more trusted by the lock than a request sent at an unexpected/atypical time. The mobile device may also automatically adjust a schedule. For example, the mobile device may log/record a user's interactions with the lock, and may set a schedule based around the user's anticipated actions. In one embodiment, a default user schedule is set (e.g., by the manufacturer, etc.). Additionally, a list of typical user schedules may also be provided to allow a user to select from one of many configuration options. In this manner, a manufacturer may provide various recommended operational settings to a user. A user may also customize a schedule to tailor the schedule as he or she desires.

A user profile may further specify a model/serial number of the lock and what types of accesses are available for that user. For example, such accesses may include: reading software/hardware version information of the lock, updating software of the lock, reading a shackle state of the lock, locking, unlocking, disarming, reading/setting a time/clock value, reading a battery level, reading/clearing event related data (e.g., flags, counters, etc.), reading a log of the lock, reading/setting/resetting a keypad code of the lock, reading communications data for the lock (e.g., transmission statuses, transmission power levels, channel information, addressing information, etc.), reading/setting default values stored for the lock (e.g., default disarm times, default unlock times, etc.), among others. A user profile may also specify a start time and a revocation date/time for the profile (i.e., when the profile begins to be valid and when the profile expires and is no longer valid). A user profile may provide maximum disarm/unlock times for the lock. A user profile may also provide an indication of a trust level of a corresponding mobile device (e.g., whether a time value/timestamp provided by the mobile device is trusted or not). The lock may be configured to allow or disallow certain functionality based on the trust level of a device. The trust level may be stored as an independent permission that the user may or may not have access to (e.g., the trust level may be managed/adjusted by the software of the lock, mobile device, or server, etc.). As an example, only a highly trusted device may be able to upgrade the firmware of the lock or change certain settings. Additionally, the lock may have a security algorithm that factors in a trust level and time value. For example, as a device successfully interacts with the lock more often, the lock may increase (or adjust) a trust level for the device. However, if a time value is out of sync with the lock's maintained time or authentication fails, the lock may decrease (or adjust) a trust level for the device. The time value provided by the mobile device may be compared to a time value maintained by the lock, and a degree of closeness between the two times may be used to indicate a trust level for the device (e.g., the closer the two times are to being in sync, the higher the trust level, etc.). If a trust level decreases below a certain threshold, the lock may discontinue or limit interactions with the mobile device. A trust level may also be based on the schedule discussed above. For example, a mobile device may be regarded as more or less trusted based on the time the device is accessing the lock, and whether that time falls within certain time periods as defined by the schedule. The time value provided by the mobile device may also be used to sync the clock of the lock with that of the mobile device, or may be used otherwise during authenticated communications. Any of the profile items discussed may have default values (e.g., manufacturer defaults) or user provided values. A profile is not limited to the above data, and additional data may be included. A profile may also be stored on a server for later retrieval.

In addition to generating a profile for the user (e.g., the owner of the lock), the user may desire to create additional guest profiles (208) to be shared with friends, family, co-workers, etc. In this manner, a user may grant another person access to the lock, based on the guest profiles. To do so, a user may enter in desired profile values (using the mobile device) for the additional person(s). Similar to the creation of the user's profile, the guest profile data may be transmitted to the server to be processed as discussed further below. The guest profile data may be transmitted to the server simultaneously or separately (e.g., at a later time) from when the user initially generates his or her profile. The mobile device includes information that differentiates the types of profiles (e.g., owner vs. guest) being provided to the server.

After at least one profile is generated, the user is associated with the particular lock as an owner of the lock. In some embodiments, the association may be based solely on the unique code that was provided to the server (e.g., in step 204). In one embodiment, after providing a unique code, the mobile device may use the unique code to automatically retrieve additional information related to the lock (e.g., a serial ID, a model number, etc.) from a database or a server of the lock's manufacturer. In alternative embodiments, a serial ID, a model number, or other code may also be provided by a user (e.g., by referring to product packaging, etc.), and such additional data may be utilized, along with the unique code, in associating a user with a lock. In some embodiments, additional authentication of a user may also be required prior to associating a user with a lock as an owner, and such authentication may be provided via the mobile device.

The management server then may verify received profile data. To verify the received profile data, the management server may perform a cyclic redundancy check (CRC) on the profile to ensure the data's integrity. Other data verification methods may also be utilized. For example, in an illustrative embodiment, a message authentication code (MAC) (e.g., a keyed-hash message authentication code (HMAC)) may be generated using the secret key and used for verification of data integrity. The scope of the present disclosed is not limited to a certain data integrity validation mechanism. The sever can then encrypt the profile data using the secret key in order to transform the profile data into an encrypted profile (e.g., ciphertext). The profile may be encrypted according to any known encryption standards. In an illustrative embodiment, the profile is encrypted using CCM mode (NIST/FIPS counter mode encryption with cipher block chaining MAC) based algorithms, and the secret key, which is used as the cipher key, has a length of 128 bits. Accordingly, the server may encrypt the user profile and also generate a MAC using the secret key. Alternatively, other standards could also be used, such as performing encryption and generating a MAC with different keys.

In one embodiment, the management server discussed herein is one of a group of management servers. In such an embodiment, a first management server may be configured to handle communications with mobile devices, and a second management server may be configured to handle security functionality (e.g., storage of keys, generation of keys, encryption/decryption processes, etc.). In this manner, the first server may receive communications from a mobile device and may communicate with the second server when security functions are required. For example, the first server may request a service provided by the second server to encrypt profile data that was initially received by the first server. The second sever may then encrypt and provide the encrypted data to the first server, which may then transmit the encrypted data to the mobile device. Other server configurations are also envisioned.

After encryption, the encrypted profile is transmitted from a server to the mobile device (210). The server also transmits the corresponding access key to the mobile device (210). In an illustrative embodiment, the access key has a length of 128 bits. The access key can be determined by the server using the unique code (e.g., as discussed in steps 202-204). The received encrypted profile and access key are then stored in a memory of the mobile device in order to complete the association of the mobile device with the lock. The user may then use his or her mobile device to interact with the lock (212).

In the scenario that a guest profile was generated, in some embodiments, the server may perform similar security procedures as performed for the user profile. For example, the guest profile may be stored and encrypted using the secret key. In some embodiments, in the case of a guest profile, the server may first transmit a notification to the guest prior to encrypting and transmitting the encrypted guest profile. For example, the server may send a notification email or text/SMS message/alert to the guest based on information that the user provided (e.g., an email address, phone number, etc.) when the user set up the guest profile. Upon reception of a notification, a guest may then activate his or her profile that was created by the user. For example, the notification may include an activation link to be clicked (e.g., within the email or message) or code that the guest is required to provide. The guest may also install the management application discussed herein and use the application to activate the guest profile using an activation code. Upon activation and installation of the management application, the server can then generate and transmit the encrypted guest profile and access key to a mobile device of the guest via the management application. After receiving the encrypted guest profile and access key, each may be stored in the guest's mobile device to associate the guest's device with the lock. The guest may then use his or her mobile device to interact with the lock (212).

After a profile is configured, the user (or guest) may interact with the lock wirelessly via the mobile device. For example, a user may lock, unlock, or adjust settings of the lock, etc. In one embodiment, the lock may wake up/detect the presence of a nearby user and begin an interaction process. For example, the lock may include proximity detection features, or the user may actively touch the lock (e.g., a touch sensitive location on the lock, a physical button, etc.), or the user's mobile device may transmit a signal on a common channel in order to wake up the lock, etc. When the lock has been woken up, it can attempt to connect with the mobile device of the user. For example, the lock may broadcast its model and serial number information (or other unique lock ID information) and wait for a response from the mobile device. The mobile device can receive the lock information and compare it to the profiles maintained by the management application. For example, the management application can maintain profiles for multiple different locks at a time. If a match is found (e.g., if a profile is found for that particular type of lock), an authentication procedure may commence to verify the matched profile. If the profile is verified, and the user has access at that particular time (i.e., based on scheduling data of the profile), and the user's time/device is trusted, the user may unlock the lock and perform other interactions with the lock. After authentication, the lock's time and mobile device's time may also be synced, if necessary.

Figure 3:
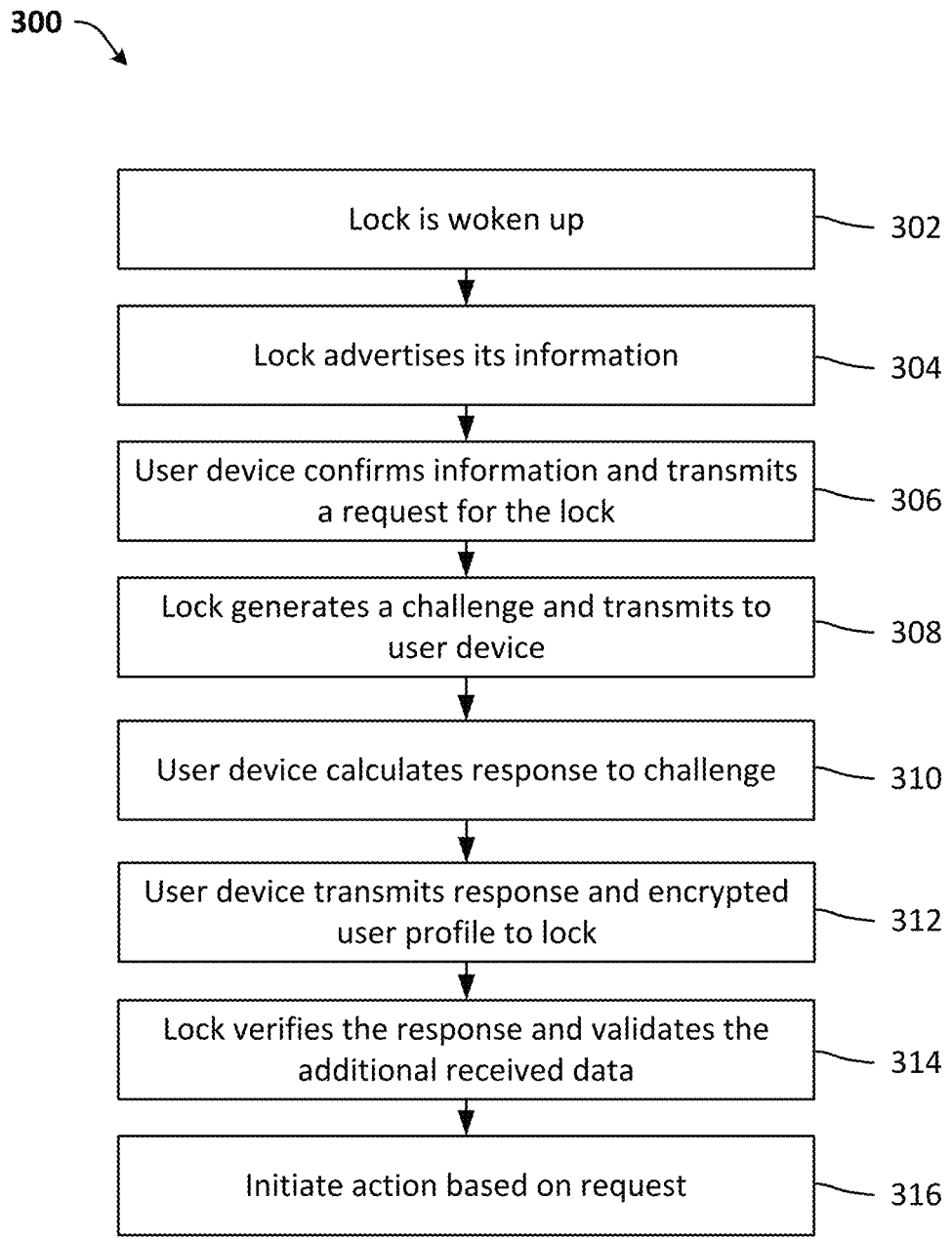
FIG. 3 is a flow diagram of a process for interacting with a product with a user device, according to an embodiment.

Referring to FIG. 3, a flow diagram 300 of an illustrative process for interacting with a product with a user device is shown, according to an embodiment. In alternative embodiments, fewer, additional, and/or different steps may be performed. Also, the use of a flow diagram is not meant to be limiting with respect to the order of steps performed.

In some embodiments, the lock may be woken up out of a low power standby or sleep state (302). For example, the lock may be touched by a user, or the proximity of the user may be automatically detected. The standby/sleep state may utilize less power (e.g., battery power) than if the lock is in a fully operational, awake state. In some embodiments, the lock may always be in a fully functional state, and may not be woken up out of a standby/sleep state.

The lock may advertise its type information (304), for example, by broadcasting a unique ID (e.g., an identifier that is formed from its model and/or serial number). The communications between the lock and device may be over any type of wireless communications protocol. In one embodiment, the mobile device and lock communicate via a Bluetooth connection. In another embodiment, the mobile device and lock communicate via a Wi-Fi connection. In another embodiment, the mobile device and lock communicate via a ZigBee connection. In another embodiment, the mobile device and lock communicate via an NFC connection. Additionally, any of the data communicated (e.g., the packets transmitted) between the mobile device and the lock may be further secured according to any known security protocol (e.g., WEP, WPA, user/manufacturer passwords, etc.). In one embodiment, data transmitted between the mobile device and lock is encrypted using the access key. In this embodiment, both the mobile device and lock are able to encrypt and decrypt data, as each has a stored copy of the access key. Upon decrypting a received data, both the mobile device and lock may further ensure the integrity of the decrypted data, for example, by using a MAC validation scheme, running a CRC check, etc., on the decrypted data. Such a MAC validation scheme also allows the mobile device and lock to verify that the data originated from its proper source (i.e., the other holder of the key used to generate the MAC, etc.).

The user device receives and confirms the lock's information (e.g., the lock's ID) (306). In one embodiment, the lock's ID is compared to a list of profiles stored on the mobile device to determine whether the mobile device is associated with the lock (e.g., whether a profile exists that corresponds to the lock's ID). If a matching profile is not found, a user may be prompted to create a profile (e.g., via process 200) using the unique code that links the lock to the secret key. If a profile is found for the lock, the user device may then transmit a request to the lock (e.g., an unlock request, etc.), and an authentication procedure can commence prior to complying with the request.

The lock generates a challenge and transmits the challenge to the user device (308). In one embodiment, the lock generates a long random number as the challenge. In another embodiment, the lock generates data that varies by communication session (e.g., a unique number (a session identifier) may be generated as the challenge for each communication session). In one embodiment, the challenge is transmitted as plaintext to the mobile device; however, in another embodiment the challenge may be encrypted using the access key. The mobile device calculates the response (e.g., a long response) for the challenge using a security algorithm and the access key (which was received from the server during configuration as discussed above) (310). In one embodiment, the mobile device uses the access key to generate the response and a MAC that is transmitted with the response. In some embodiments, the communications between the mobile device and lock are secured further based on sequential identification (e.g., sequential identification of packets or messages). For example, with sequential identification, the mobile device may transmit a field that should follow a particular sequence for each received packet. The lock may then verify the received packets against a known sequence. Such a known sequence may be predetermined or generated by the lock, and also may be provided to the mobile device by the lock during communications. Accordingly, this sequencing may be used along with one or more of the other methods described above (e.g., a session identifier may be used along with a predetermined initial sequence field value), or sequencing may be used by itself (e.g., the lock may provide the initial value of the sequence field upon connection). In one embodiment, upon connection, the mobile device receives an initial sequence number from the lock, and the lock verifies that subsequently received messages contain the initial number incremented once for each message received. The lock may further verify that the received messages are encrypted using the access key and/or include a MAC computed therefrom.

The mobile device can then transmit to the lock the response and the corresponding encrypted profile (which was encrypted by the server using the secret key as discussed above) (312). In one embodiment, the mobile device also transmits a current timestamp based on the mobile device's clock. As the lock stores both the secret key and access key, it may use these keys to authenticate the data received from the mobile device. In one embodiment, the lock uses the access key to verify that the response to the challenge is correct and to verify the MAC (314). In one embodiment, the lock requires the response to be verified prior to then accepting and attempting to decrypt the profile. Upon successful completion of the challenge-response process, the lock can validate the received data (314). The lock can use the secret key to decrypt the encrypted profile, and the lock may also validate the data (e.g., using the MAC generated from the secret key or other validation scheme, e.g., performing a CRC check) of the decrypted profile data to ensure that the decryption was successful and that the data in fact came from the correct source (e.g., that the encrypted profile was generated by the server, etc.). The lock may also ensure that the profile has access at that verified time (e.g., by referring to the scheduling information included in the decrypted profile). In an embodiment where the mobile device transmitted a timestamp, the lock may verify the timestamp by comparing the timestamp with a current time of the lock. If the response and decrypted profile are each verified, then the lock may comply with the request of the mobile device and initiate a corresponding action (316). In an embodiment utilizing the timestamp discussed above, a received timestamp may also be required to be within a threshold amount of time from a time maintained by the lock. In this example, the lock can unlock its shackle as requested.

In another embodiment where the lock is configured as a digital locking device (e.g., to store secured data in its memory), the lock may use its copy of the secret key to decrypt content that is stored in the lock. Accordingly, if a request is received from a mobile device to retrieve or store certain data such a locking device, a transfer of such data may be initiated in response to the request. For example, if a mobile device requests to store data, and the corresponding encrypted profile that was provided during authentication allows such an action, and authentication as discussed above was successful, the mobile device may proceed to transmit data (and the locking device may receive such data) to the locking device. The locking device may then store the received data in its memory. If the received data is not yet encrypted, the locking device may use its secret key to encrypt the data to be stored. As another example, if a mobile device requests to retrieve data, and the corresponding encrypted profile that was provided during authentication allows such an action, and authentication as discussed above was successful, the lock may decrypt and transmit requested data to the mobile device. Alternatively, the lock may transmit encrypted data, and the mobile device may then communicate with the server (which also stores a copy of the secret key) for decryption purposes. Any typical data interactions (e.g., deleting data, renaming files, copying data, organizing data, etc.) may also be supported by the digital locking device, which may be based on the types of accesses specified in the corresponding user profile.

Additional security related features may also be implemented by the server discussed herein. For example, in the instance an access key or secret key is compromised, an operator of the server or the user (via the mobile application) may initiate a protective measure. For example, the user may request a new key pair to be generated. In one embodiment, the server can generate a new key pair consisting of a newly generated secret key and the old access key, and encrypt the new key pair using the old secret key (similar to the encryption of a profile as discussed above). The server may then communicate with the mobile device to queue a key pair change request. If a user has multiple devices, or guest profiles, the user may select one or more particular devices on which the key pair change request is queued. Upon the next access attempt by the mobile device with the lock, a challenge-response sequence as discussed above may be initiated; however, the requested action can be a "key change request." As part of the challenge response transmission, the mobile device may include the encrypted new key pair. For example, the mobile device may transmit the response, and then the encrypted new key pair. Upon validation of the response, the lock may decrypt the encrypted new key pair using the old secret key and verify the data. If successful, the lock may access the new secret key from the decrypted new key pair, and then store the new secret key to be used in future interactions. In addition to updating the secret key, other functionality may be provided through similar challenge-response exchanges and encryption using the secret key. In one embodiment, instead of transmitting a "key change request," the mobile device may transmit a "firmware update request" along with new firmware version that is encrypted with the secret key. Upon successful authentication, the lock may proceed to decrypted the new firmware, and then update its firmware to the new version.

Any of the devices discussed herein (e.g., user device, product, server) may also be configured to generate an audit trail related to its operations. For example, a log may be formed to detail the events that occur throughout the interaction of a user device and a product. This may include server-to-user device events (e.g., sending an encrypted profile, sending a new key pair request, etc.), user device-to-product events (e.g., sending/responding to an unlock request, logging when authentication succeeds and fails, etc.), device-only events (e.g., logging application errors, logging shackle status of an electronic locking device, etc.), among others. The scope of the present disclosure not limited to a particular log formatting.

In one embodiment, the lock is additionally equipped with a location determination circuit, such as a GPS device/receiver, and may transmit its location information (e.g., GPS coordinates) to the mobile device during interactions with the mobile device. The location information may then be stored by the mobile device (e.g., within the profile created for the lock, etc.) as a last known location of the lock. The mobile device's management application can also be equipped with mapping functionality so that the last known location of the lock may be displayed on a map, based on the provided location information. Alternatively, the management application may allow the location information to be exported to a third party mapping application. These location features can allow a user to open the management application on his or her mobile device, and then view a map that indicates where the lock was located when the last known location (e.g., GPS coordinates) was provided. Additionally, navigational directions or other features may be provided to guide a user to the lock. In an alternative embodiment, the mobile device may also include a GPS device. In this manner the mobile device may also record its location information during interactions with the lock and server.

Figure 4:
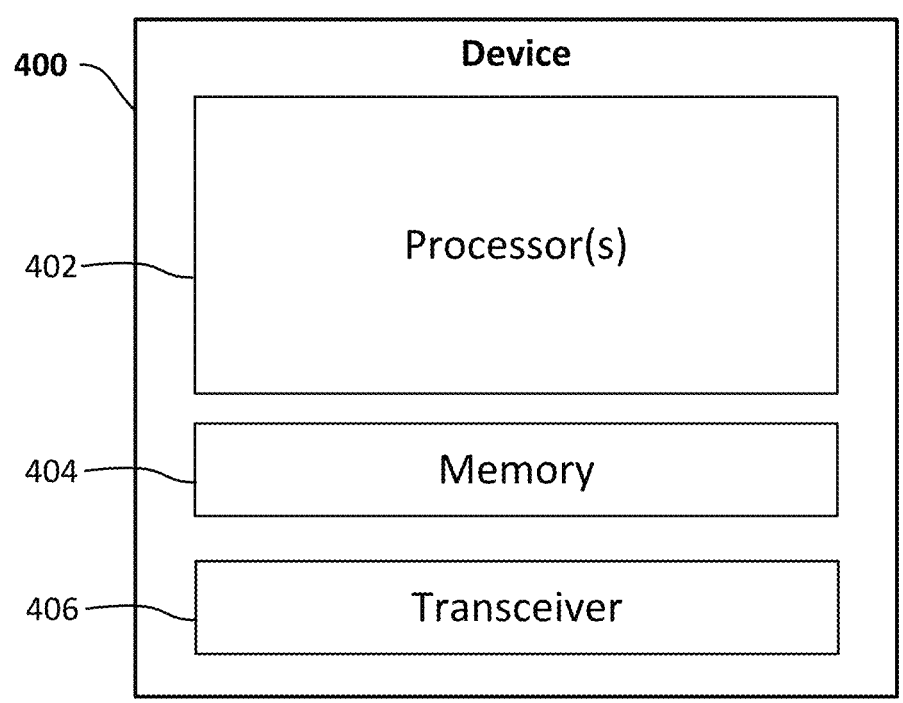
FIG. 4 is a block diagram of a device for implementing the techniques disclosed herein, according to one embodiment.

In any of the embodiments discussed herein, the devices may form a portion of a processing subsystem including one or more computing devices having memory, processing, and communication hardware. The devices (e.g., servers, user devices, products) may be a single device or a distributed device, and the functions of the devices may be performed by hardware and/or as computer instructions on a non-transient computer readable storage medium, and functions may be distributed across various hardware or computer based components. Referring to FIG. 4, a device 400 is shown, which may represent any of the devices discussed herein. Device 400 may also be used to implement the techniques and methods discussed herein. For example, device 400 may comprise the processing components of user device 102 (e.g., the processing components of a mobile phone). As another example, device 400 may comprise the processing components of server 104. As another example, device 400 may comprise the processing components of product 106 (e.g., the processing components of an electronic locking device). In addition, device 400 may be configured to perform the computations discussed herein (e.g., the computations related to processes 200 and 300, etc.) and generate the signals necessary to communicate with other devices, encrypt and decrypt data, authenticate data, etc., in order to implement the techniques of this disclosure.

Device 400 typically includes at least one processor 402 coupled to a memory 404. Processor 402 may be any commercially available CPU. Processor 402 may represent one or more processors and may be implemented as a general-purpose processor, an application specific integrated circuit (ASIC), one or more field programmable gate arrays (FPGAs), a digital-signal-processor (DSP), a group of processing components, or other suitable electronic processing components. Memory 404 may include random access memory (RAM) devices comprising a main storage of the device 400, as well as any supplemental levels of memory, e.g., cache memories, non-volatile or back-up memories (e.g., programmable or flash memories), read-only memories, etc. In addition, memory 404 may include memory storage physically located elsewhere, e.g., any cache memory in the processor 402 as well as any storage capacity used as a virtual memory, e.g., as stored on a mass storage device, etc. Device 400 also includes transceiver 406, which includes any additional networking components or transmitters necessary to communicate with other devices (e.g., Wi-Fi networking components, Bluetooth components, ZigBee components, NFC components, etc.). For example, in an embodiment where device 400 comprises an electronic lock, transceiver 406 may be a Bluetooth transceiver configured to communicate with a user's mobile device. As another example, in an embodiment where device 400 comprises a server, transceiver 406 may be a networking interface configured to couple the server to a network to communicate with a mobile device. As another example, in an embodiment where device 400 comprises a mobile device, transceiver 406 may include a Wi-Fi or cellular transceiver configured to communicate with a server, and transceiver 406 may further include Bluetooth components configured to communicate with a product (e.g., an electronic locking device).

In general, the routines executed to implement the embodiments may be implemented as part of an operating system or a specific application, module, or sequence of instructions. In certain embodiments, device 400 includes one or more modules structured to functionally execute the respective operations necessary for wireless key management for authentication as described herein. The description herein including modules emphasizes the structural independence of the aspects of a device and illustrates one grouping of operations and responsibilities of a device. More specific descriptions of certain embodiments of a device's operations are described by the sections herein referencing FIGS. 1-3. Other groupings that execute similar overall operations are understood within the scope of the present application. The modules typically comprise one or more instructions set at various times in various memory and storage devices in a computer, and that, when read and executed by one or more processors in a computer, cause the computer to perform operations necessary to execute elements of disclosed embodiments. Moreover, various embodiments have been described in the context of fully functioning computers and computer systems, those skilled in the art will appreciate that the various embodiments are capable of being distributed as a program product in a variety of forms, and that this applies equally regardless of the particular type of computer-readable media used to actually effect the distribution.

Figure 5:
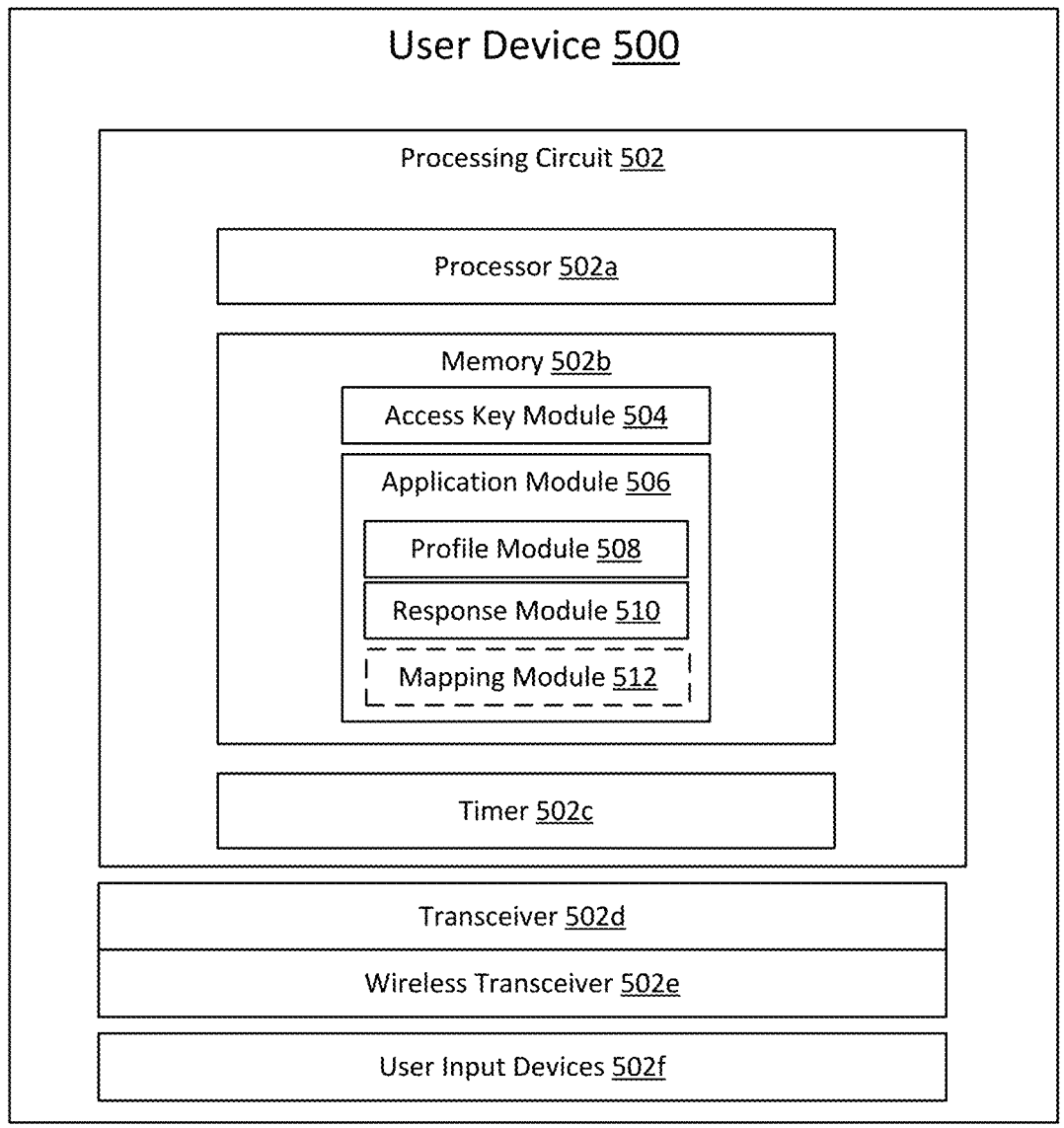
FIG. 5 is a block diagram of a user device for implementing the techniques disclosed herein, according to one embodiment.

Referring to FIG. 5 a block diagram of a user device 500 for implementing the techniques disclosed herein is shown, according to one embodiment. For example, user device 500 may correspond to the mobile devices discussed herein. In one embodiment, user device 500 is a mobile phone. In another embodiment, user device 500 is a laptop computer. In another embodiment, user device 500 is a tablet computer. In another embodiment, user device 500 is a desktop computer. In general, user device 500 includes a processing circuit 502, which may include a processor 502a, a memory 502b, and a timer 502c. Processor 502a may be any commercially available processor or any of the processors discussed herein (e.g., processor(s) 402, etc.). Memory 502b includes any of the memory and/or storage components discussed herein. For example, memory 502b may include RAM and/or cache of processor 502a. Memory 502b may also include one or more storage devices (e.g., hard drives, flash drives, computer readable media, etc.) either local or remote to user device 500.

Memory 502b includes various software modules configured to implement the techniques disclosed herein with respect to user devices. For example, memory 502b includes an access key module 504, which is configured to store and provide the access key as requested by the other modules of memory 502b. Application module 506 is configured to provide the management application as discussed herein. For example, in an embodiment where user device 500 is a mobile phone, application module 506 includes the software corresponding to a mobile phone app, which may be used to interface with a server and/or product. Application module 506 may include a profile module 508, which is configured to manage the profile generation process, including interactions with the server and product. For example, a user may interact with user device 500 (e.g., via user input devices 502f) through the application provided by application module 506. The user may create one or more profiles corresponding to one or more products, which are transmitted (e.g., via transceiver 502d) to a server. The server may encrypt a user profile, and profile the encrypted user profile, access key, MAC, etc., to the user device 500 as discussed herein. Application module may also interact with a product (e.g., an electronic locking device) via wireless transceiver 502e as discussed herein. A response module 510 may include the security algorithms required for generation a response to a challenge sent by a product. Additionally, the response module 510 may include encryption/decryption and MAC authentication algorithms, which may be accessed by application module 506 during secured communications. Memory 502b may further include a timer 502c, which may include the clock components of processor 502a, for maintaining a device time to be used as described herein.

In some implementations, memory 502b may include a mapping module 512 that may be used to generate one or more mapping interfaces based on location data received from a product (e.g., locking device). One such implementation is described below with respect to FIG. 8.

User device 500 further includes transceiver 502d and wireless transceiver 502e (which may correspond to transceiver 102d and wireless transceiver 102e of user device 102, etc.), which include various communication circuitry. For example, in one embodiment, transceiver 502d may include cellular components and/or Wi-Fi components and wireless transceiver 502e may include Bluetooth components, etc. User input devices 502f may include one or more user input devices for interaction with user device 500. For example, user input devices 502f may include one or more buttons, touch screens, displays, speakers, keyboards, stylus inputs, mice, track pads, etc.).

Figure 6:
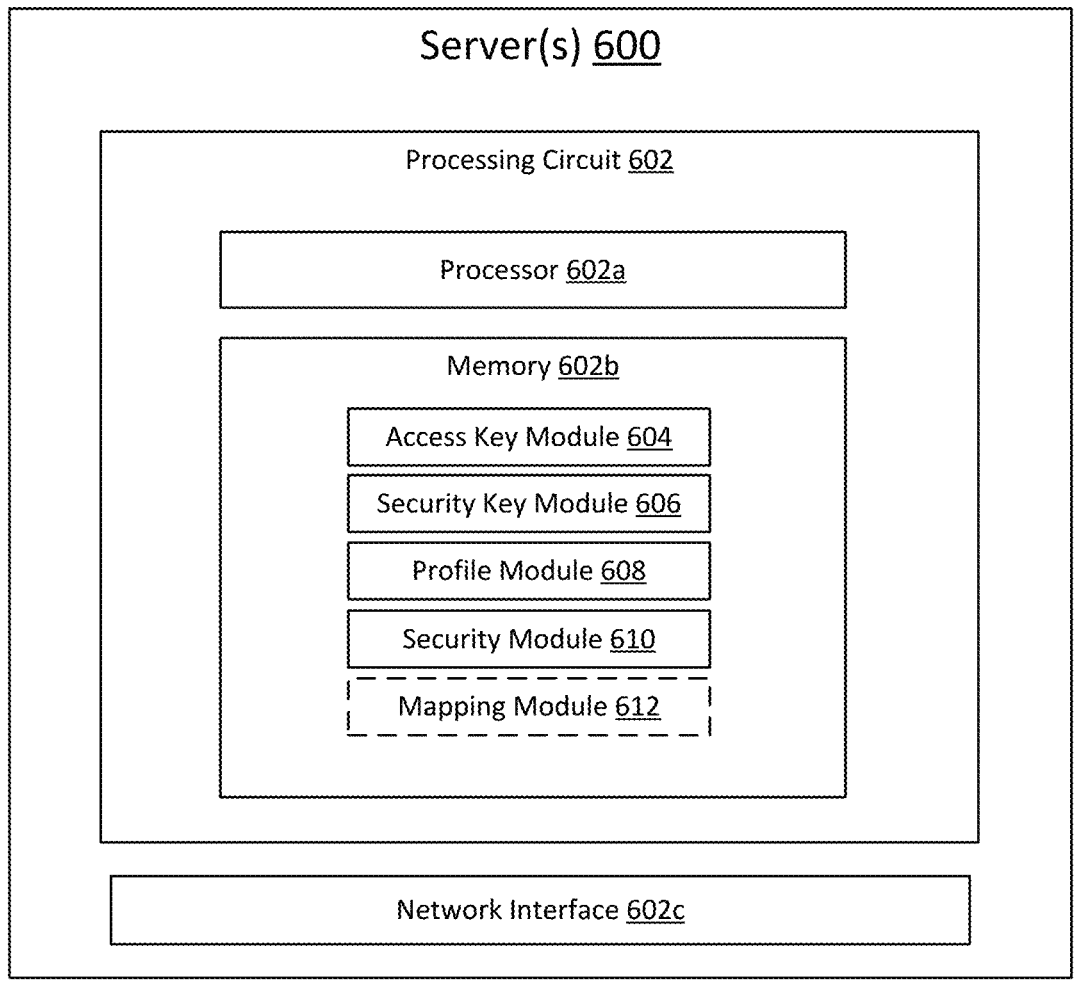
FIG. 6 is a block diagram of a server for implementing the techniques disclosed herein, according to one embodiment.

Referring to FIG. 6 a block diagram of servers 600 for implementing the techniques disclosed herein is shown, according to one embodiment. Servers 600 include one or more physical or virtual servers/server slices, etc. For example, servers 600 may correspond to server(s) 104. In general, servers 600 are configured to interact with a user device (e.g., user device 500, etc.). A server 600 may include a processing circuit 602. Processing circuit 602 includes a processor 602a and memory 602b. As an example, processor 602a may include any commercial available processor, e.g., a server processing chip, a virtual processor, etc. Memory 602b includes any of the memory and/or storage components discussed herein. For example, memory 602b may include RAM and/or cache of processor 602a. Memory 602b may also include any mass storage devices (e.g., hard drives, flash drives, computer readable media, etc.).

Memory 602b may include an access key module 604 and security key module 606. The access key module 604 and security key module 606 may be configured to securely store access keys and security keys, respectively. The access and security keys may correspond to products as discussed herein. As an example, access key modules 604 and security key module 606 may correspond to databases of keys, and may include the software configured to store and retrieve such keys. Profile module 608 includes the software configured to interact with a product (e.g., to manage the process of user and guest profile generation, storage, and communication with a user device). Profile module 608 may also interact with security module 610, which may include the security algorithms as discussed herein. For example, security module 610 may be configured to generate an access key, a security key, encrypt/decrypt data, generate a MAC based on data, etc., and provide such data to profile module 608. In one embodiment, the security functions of security module 610 and access key module 604 and security module 606 are located on separate servers 600 from profile module 608. In this embodiment, various services may be provided by appropriate servers such that profile module 608 may access security functions and retrieve keys as necessary to implement the techniques discussed herein. In some embodiments, servers 600 are also configured to interact with a product (e.g., product 106). For example, during a manufacturing process, servers 106 may provide an access key and security key to be stored in a corresponding product.

In some implementations, memory 602b may include a mapping module 612 that may be used to generate one or more mapping interfaces based on location data received from a product (e.g., locking device). One such implementation is described below with respect to FIG. 8.

Figure 7:
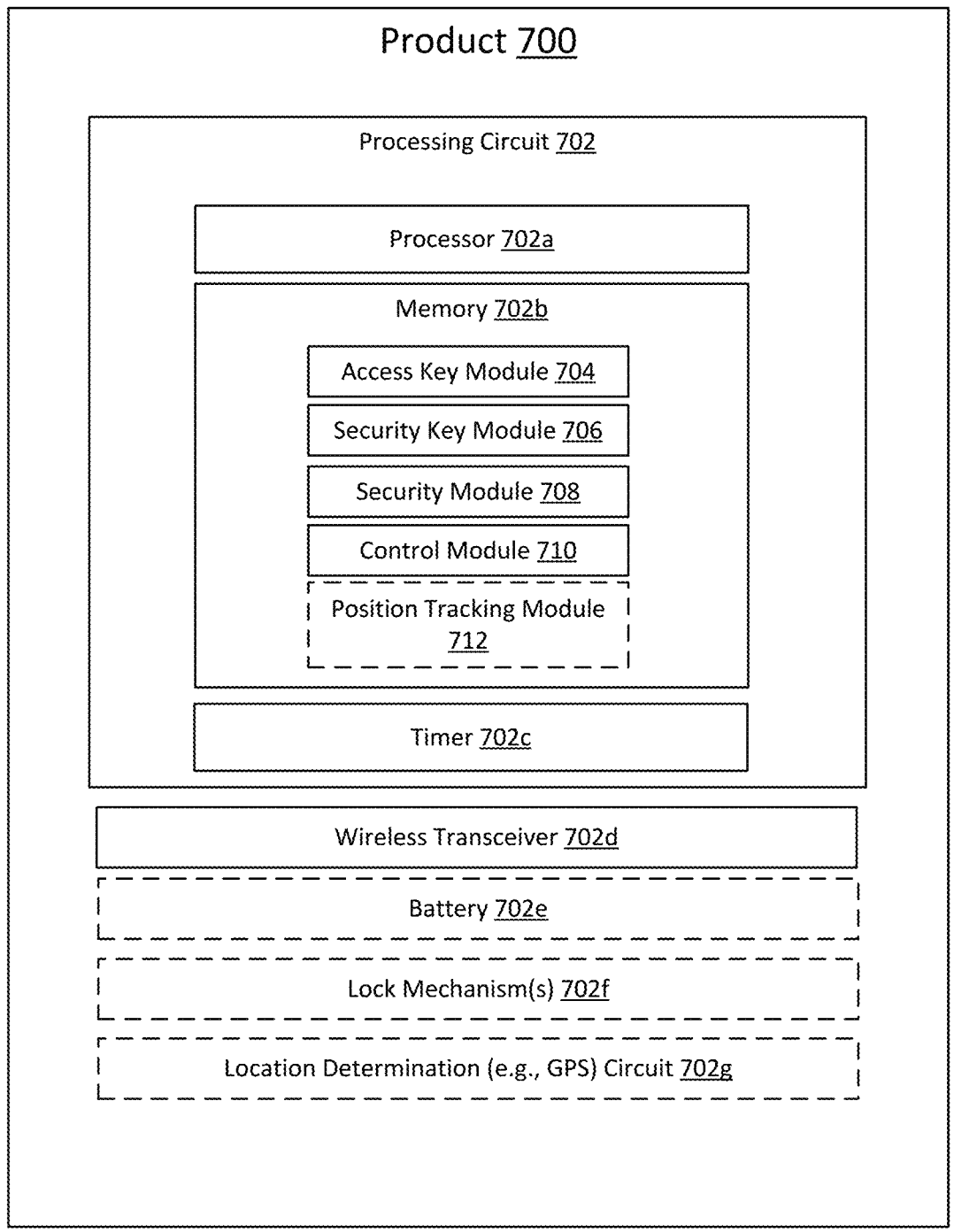
FIG. 7 is a block diagram of a product for implementing the techniques disclosed herein, according to one embodiment.

Referring to FIG. 7 a block diagram of a product 700 for implementing the techniques disclosed herein is shown, according to one embodiment. For example, product 700 may be a lock as discussed herein. In general, product 700 includes a processing circuit 702, which may include a processor 702a, a memory 702b, and a timer 702c (which may include the clock components of processor 702a, for maintaining a product time to be used as described herein). Processor 702a may be any commercially available processor or any of the processors discussed herein (e.g., processor(s) 402, etc.). Memory 702b includes any of the memory and/or storage components discussed herein. For example, memory 702b may include RAM and/or cache of processor 702a. Memory 702b may also include one or more storage devices (e.g., hard drives, flash drives, computer readable media, etc.).

Memory 702b includes various software modules configured to implement the techniques disclosed herein with respect to products (e.g., electronic locking devices, etc.). For example memory 702b may include an access key module 704, a security key module 706, a security module 708, and a control module 710. The access key module 704 and security key module 706 are configured to store the product's corresponding access key and security key, respectively. Other modules of memory 702b may interact with access key module 704 and security key module 706. For example security module 708, which includes the security algorithms for the product (e.g., encryption/decryption algorithms, MAC generation/verification algorithms, etc.), may retrieve an access key from access key module 704 when generating a challenge to be sent to a user device. As another example, security module 708 may access security key module 708 to retrieve a security key to decrypt an encrypted user profile received from a user device. Control module 710 contains the software configured to interact with the other modules of memory 702b to implement the techniques disclosed herein with respect to a product. For example, in an embodiment where product 700 is a lock, after being awoken, control module 710 may attempt to pair/communicate with a user device (via wireless transceiver 702d). Control module 710 may also include operating system (e.g., an embedded operating system, firmware, etc.) software for product 700. As another example, control module 710 may request security module 708 to access a user profile and request to determine an action to be taken. Based on the permissions of the user profile and the request, control module 710 may determine whether or not to take a request action. For example, control module 710 may generate the signals necessary to control mechanical (and electronic) components of product 700 (e.g., lock mechanisms 702f) in response to a request (e.g., an unlock request for a lock, etc.). As another example, control module 710 may interface with lock mechanisms 702f to control a user's physical interactions with a lock (e.g., control module 710 may receive input from a dial interface, a key code interface, buttons, touch interface, etc.) in order to unlock a shackle of the lock.

In some embodiments, product 700 may include a location determination circuit 702g, such as a Global Positioning System (GPS) device/receiver, that may determine one or more locations of product 700 at one or more times. In some such embodiments, memory 702b may include a position tracking module 712 configured to receive the location data from location determination circuit 702g and store data indicative of the location or position of product 700 at one or more times. One such embodiment is discussed below with respect to FIG. 8.

Wireless transceiver 702d includes communications hardware (e.g., Bluetooth components, radiofrequency components, NFC components, ZigBee components, RFID components, Wi-Fi components, etc.) for wirelessly communication with another device (e.g., user devices 500, servers 600, etc.). In some embodiment, product 700 includes a battery 702e for providing power to the product. In an embodiment where product 700 is a lock, lock mechanism(s) 702f includes one or more physical and/or electronic locking mechanisms (e.g., pins, shackles, dials, buttons, shafts, keyholes, etc.) as discussed herein. For example, lock mechanism(s) 702f may correspond to lock mechanisms 106g.

Figure 8:
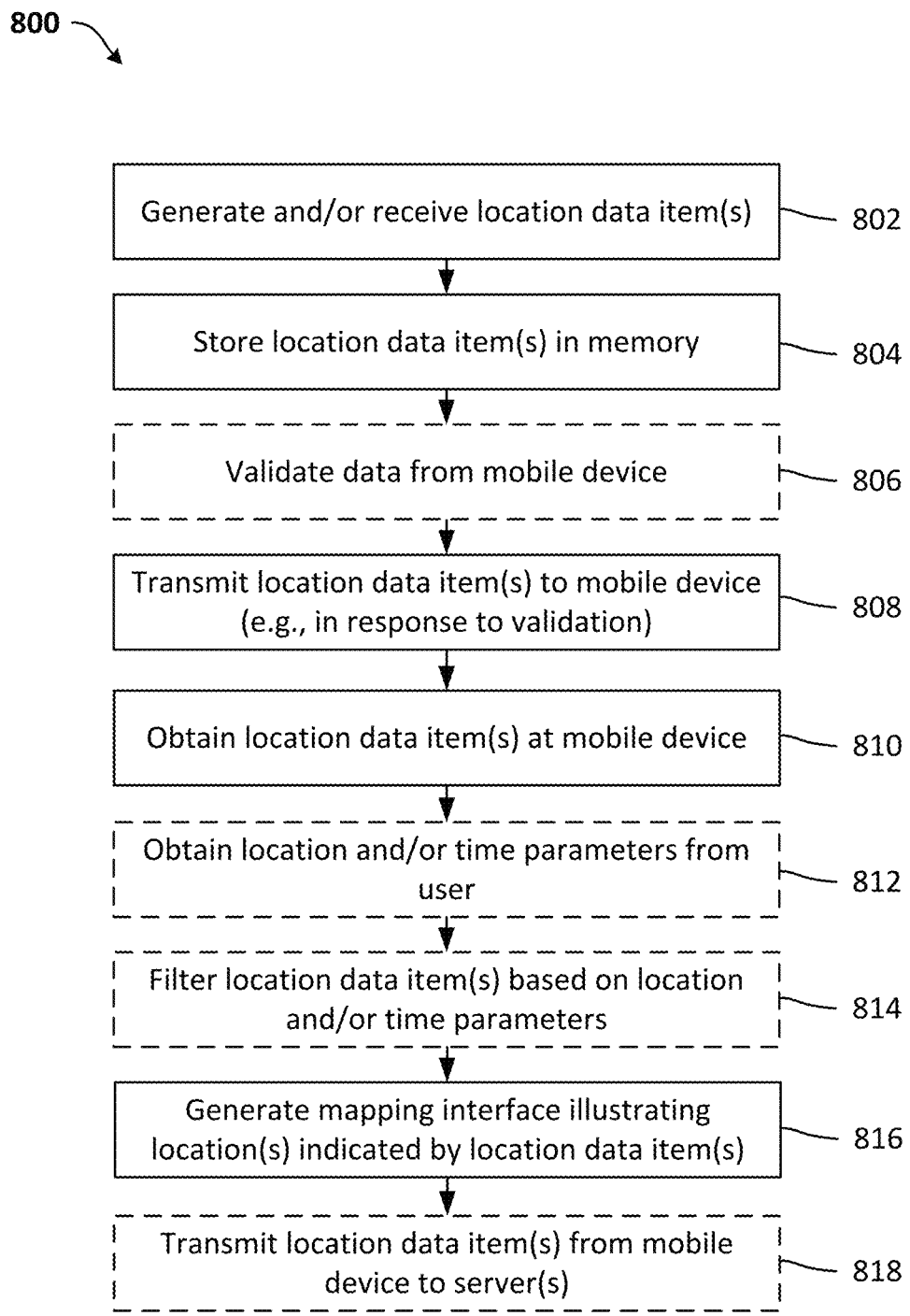
FIG. 8 is a flow diagram of a process for determining location data for a product and, optionally, generating a mapping interface indicating the determined location(s), according to one embodiment.

In some embodiments, a product (e.g., locking device) may include a location determination circuit (e.g., GPS receiver), and may generate and store location information for the lock. Referring now to FIG. 8, a flow diagram of a process 800 for collecting location data for a product and displaying the location data on a mapping interface of a mobile device is shown according to an exemplary embodiment. While process 800 illustrates providing a mapping interface, it should be appreciated that, in some embodiments, the product may generate/receive location data for the locking device, store the data, and/or transmit the data to the mobile device and/or one or more servers without the mobile device/server(s) generating mapping interfaces.

The product may generate and/or receive one or more location data items indicating a location of the product at one or more times (802). In some embodiments, the location data items may be generated by a location determination circuit, such as a GPS receiver, and may be transmitted to one or more processors of the product. The location data items may be stored in a memory (804).

The product may receive a request to transmit data to a mobile device. In some embodiments, the request may specifically request location data from the product. In other embodiments, the request may be a connection request, and the product may transmit location data in response to successfully connecting with the mobile device. In some embodiments, the product may validate data from the mobile device before providing the mobile device with the location data (806). In some such embodiments, validation of the data may be performed using a process similar to that described above with reference, for example, to FIGS. 2 and 3 (e.g., transmitting a challenge, verifying the response to the challenge, validating the data using a secret key, etc.). The product may transmit the location data items to the mobile device (808). In some embodiments, the product may only transmit the location data items to the mobile device if the data is validated.

The mobile device may obtain the location data item(s) from the product (810). In some embodiments, the mobile device may also obtain location and/or time parameters from a user for use in generating a mapping interface (812). For instance, location parameters may specify one or more location areas (e.g., buildings, geographic areas, etc.) to which locations displayed in the mapping interface should be restricted. In one such implementation, the location parameters may be based on current settings (e.g., geographic focus and/or zoom level) of a mapping interface. Time parameters may restrict a time associated with the results. For instance, in some embodiments, the user may indicate a desire to see only the last known location of the product. In some embodiments, the user may wish to see only locations during the past week. The mobile device may filter the location data item(s) based on the location and/or time parameters (e.g., before generating the mapping interface) (814). For example, items that do not fulfill the parameters may be removed from the set of data to be displayed within the mapping interface.

The mobile device may generate a mapping interface illustrating one or more locations indicated by the one or more location data items (e.g., filtered items) (816). In some implementations, the mobile device may be configured to generate the entire rendered mapping interface, including buildings, points of interest, and/or other mapping elements. In some implementations, the mobile device may illustrate the location information as an overlay on a mapping interface generated by a third party, such as a mapping interface that permits the addition/overlay of custom location points. The mapping interface may be transmitted to a display of the mobile device. In some implementations, the location data item(s) may be transmitted to one or more server(s) (818). For instance, in one implementation, the mobile device may be configured to illustrate a last known location of the product, and an interface administered by the server(s) may allow a user to see several different locations over a specified timeframe.

Referring generally to FIGS. 9 through 15B, further embodiments for use in interaction with a product, such as a locking device, using a user device (e.g., a mobile device) are shown according to exemplary embodiments. In some embodiments, the features discussed below may be used to allow for secure communication between the user device and product without storing (e.g., permanently) a user key on the product (e.g., during a manufacturing phase). For instance, the user key may be communicated from the user device to the product and stored and used temporarily (e.g., during a communication session). It should be understood that features described above with reference to FIGS. 1 through 8 may be utilized with the embodiments described below with reference to FIGS. 9 through 15B, and vice-versa, according to various implementations of the present disclosure.

Figure 9:
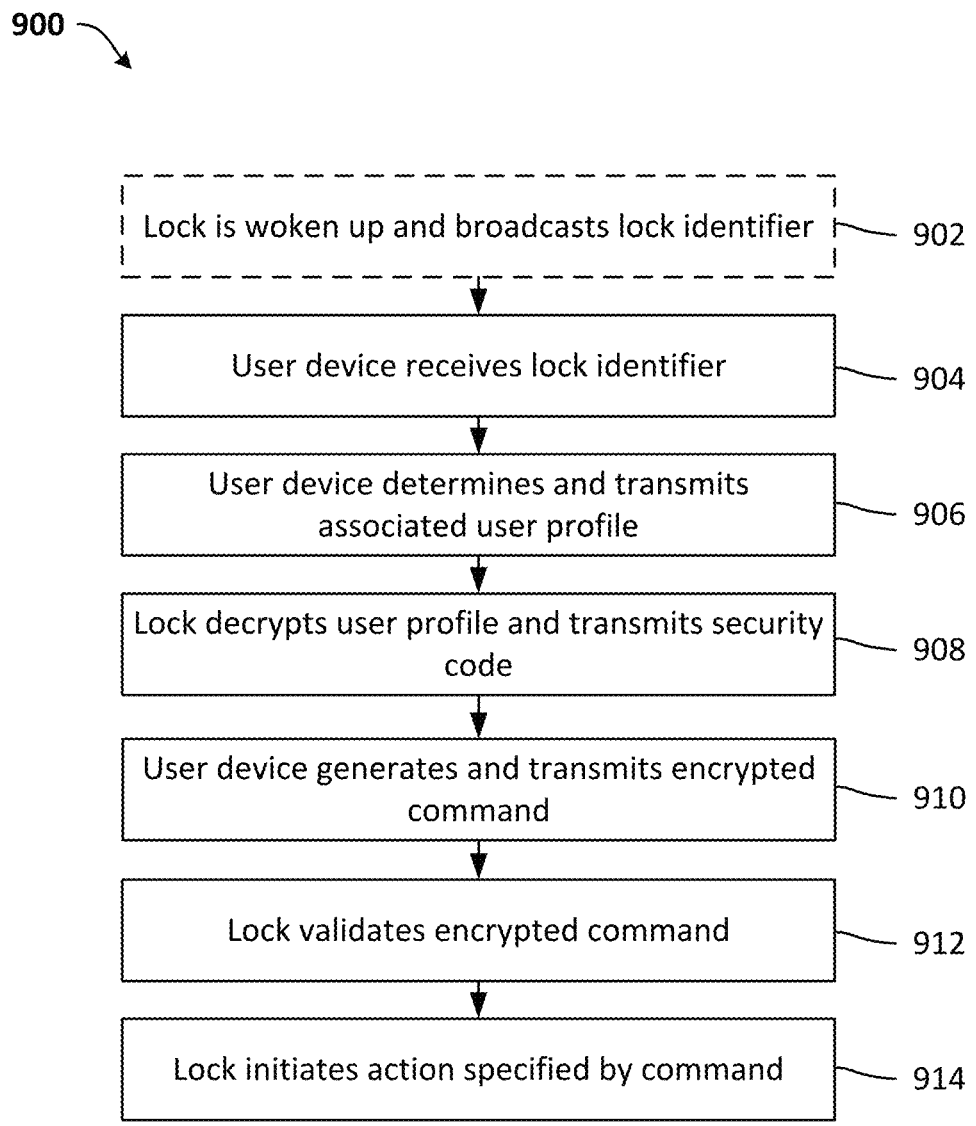
FIG. 9 is a flow diagram of a process for interacting with a product with a user device, according to an embodiment.

Referring specifically to FIG. 9, a flow diagram 900 of an illustrative process for interacting with a product with a user device is shown, according to an embodiment. In alternative embodiments, fewer, additional, and/or different steps may be performed. Also, the use of a flow diagram is not meant to be limiting with respect to the order of steps performed. In some embodiments, the lock key referenced below may be similar or equivalent to the secret key discussed above, and the user key referenced below may be similar or equivalent to the access key discussed above.

In some embodiments, the lock may be woken up out of a low power standby or sleep state (902). For example, the lock may be touched by a user (e.g., a button on the lock may be pressed), or the proximity of the user may be automatically detected (e.g., using a proximity sensor, such as an NFC sensor). The standby/sleep state may utilize less power (e.g., battery power) than if the lock is in a fully operational, awake state. In some embodiments, the lock may always be in a fully functional state, and may not be woken up out of a standby/sleep state. In some embodiments, upon waking out of the low power sleep state, the lock may broadcast or otherwise advertise a unique lock identifier associated with the lock (e.g., an identifier that is formed from its model and/or serial number).

The user device receives the lock identifier (904). In one embodiment, the lock identifier is compared to a set of lock identifiers stored on the mobile device to determine whether the mobile device is associated with the lock (e.g., whether a profile exists that corresponds to the lock identifier). For example, each user profile may have a list of lock identifiers identifying locks that the user associated with the user profile has permission to access. If a matching profile is not found, a user may be prompted to create a profile (e.g., via process 200) using the unique code that links the lock to the lock key. If a profile is found for the lock, the user device may then transmit the profile to the lock (906). The profile is associated with at least one lock identifier (and thus a lock) and is authenticated and encrypted by a server using a lock key that is stored by the server and the lock. In some embodiments, the lock key may be stored only in the server and the lock, and not in the mobile device of the user. If the lock key is hacked, the key could be used only on that one lock, and getting it out of the lock may destroy the lock in the process. The lock key may be used to authenticate and encrypt/decrypt the profile of one or more users (e.g., every user) of the lock associated with the lock key. The profile includes a user key.

The lock receives the profile and uses the lock key to decrypt and authenticate the profile. In one embodiment, the lock generates a security code (908). In some embodiments, the security code may be a sequence number or sequential identification (e.g., sequential identification of packets or messages). For example, with sequential identification, the mobile device may transmit a field that should follow a particular sequence for each received packet or command. The lock may then verify the received packets against a known sequence. In one embodiment, the mobile device receives an initial sequence number from the lock, and the lock verifies that subsequently received messages contain the initial number incremented once for each message received.

In some embodiments, the security code may be valid for a limited time frame. For example, in some embodiments, the security code may be valid for a particular amount of time after a first use of the code. In some embodiments, the security code may be valid only for a certain number of commands, transactions, and/or communication sessions. In some such embodiments, the security code may be used only for a single command or single communication session, and may not be used again thereafter.

Such a known sequence may be predetermined or generated by the lock, and also may be provided to the mobile device by the lock during communications. Accordingly, this sequencing may be used along with one or more of the other methods described above (e.g., a session identifier may be used along with a predetermined initial sequence field value), or sequencing may be used by itself (e.g., the lock may provide the initial value of the sequence field upon connection). The lock may further verify that the received messages are encrypted using the user key and/or include a MAC computed therefrom.

The mobile device can then generate and transmit to the lock an encrypted command, the encrypted command including the security code and encrypted using the user key (910). Authenticating and encrypting/decrypting communications using the user key, in combination with a security code that is unique to a particular command and/or communications session such as a sequence number, may help prevent replay of communications, sniffing, and manipulation attacks. In one embodiment, the mobile device also transmits a current timestamp based on the mobile device's clock. In some embodiments, the security code is included in the generation of a user authentication MAC and is not included in the encrypted command.

The lock can validate the encrypted command (912). In some embodiments, the lock validates the encrypted command by decrypting the encrypted command using the user key obtained from the decrypted user profile, determining whether the security code is valid, and/or authenticating the decrypted command using the user key. In some embodiments, both the lock and mobile device may verify that the security code field is as expected, and may establish the initial state of expectations upon connection. In some embodiments, the server may also generate a code to link the product to the lock key in which it was generated. In some embodiments, that code may ship with the lock (e.g., as a label on an instruction sheet secured within the packaging). As discussed above, the server may also generate a unique identifier for the lock (e.g., serial identifier) that may be different from a product code to prevent attackers from trying to guess serial numbers and own access to locks that are still on the shelf.

In some embodiments, the security code may be used in generating a separate code for a communication session, such as a user authentication MAC. In some such embodiments, the security code may be transmitted from the lock to the mobile device in a first instance, and the security code may be included in a first encrypted command sent from the mobile device to the lock. In subsequent communications, the security code may or may not be included. The lock may verify the user authentication MAC in the subsequent communications, and by verifying the MAC, the lock is in turn indirectly verifying the security code. Thus, in some embodiments, the security code may not be included in the payload of one or more messages/commands.

In some embodiments, the lock may also ensure that the profile has access at that verified time (e.g., by referring to the scheduling information included in the decrypted profile). In an embodiment where the mobile device transmitted a timestamp, the lock may verify the timestamp by comparing the timestamp with a current time of the lock. In an embodiment utilizing the timestamp discussed above, a received timestamp may also be required to be within a threshold amount of time from a time maintained by the lock. In an embodiment (e.g., if permitted by user profile permissions), the timestamp from the mobile device may be used to synchronize or update a time of the lock.

If the profile and command are both verified, then the lock may comply with the request of the mobile device and initiate a corresponding action (914). In an embodiment, the lock can activate a physical locking component. In an embodiment, the lock, after activating a physical locking component, broadcasts its lock identifier, the mobile device transmits the user profile, the lock transmits a new security code, and the mobile device transmits another encrypted command including the new security code (e.g., read status, synchronize time, audit data, modify configuration, etc.).

Figure 10:
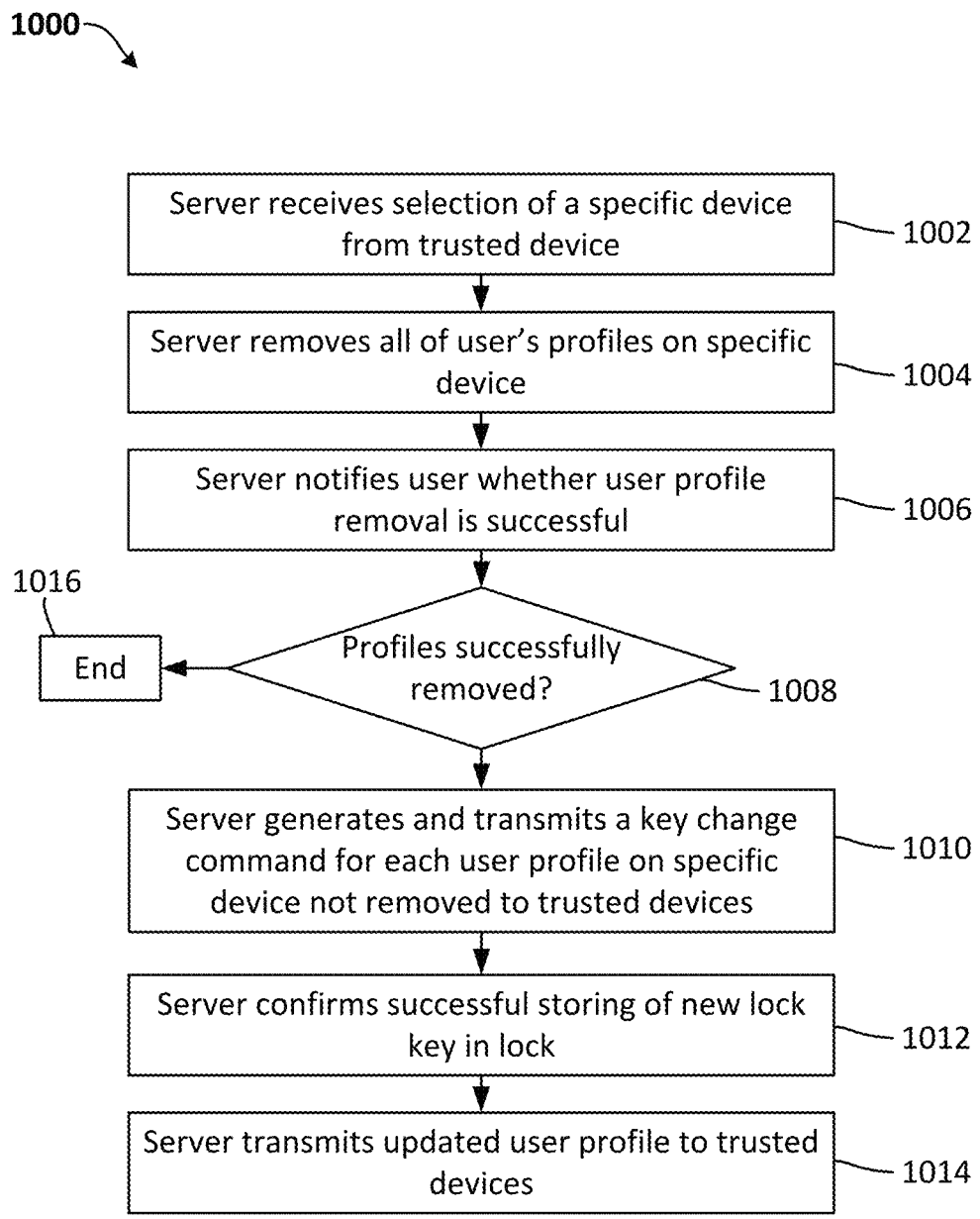
FIG. 10 is a flow diagram of a process for removing user profiles from a specific user device, according to an embodiment.

Referring to FIG. 10, a flow diagram 1000 of an illustrative process for removing user profiles from a specific user device is shown, according to an embodiment. In alternative embodiments, fewer, additional, and/or different steps may be performed. Also, the use of a flow diagram is not meant to be limiting with respect to the order of steps performed. A process of removing user profiles from a specific user device may be used, for example, to prevent a third party from having access to locks when the specific user device is lost, stolen, or otherwise not in the possession of the user.

In an embodiment, the server may receive a selection of a specific user device from a trusted device of the user (1002). In some embodiments, the server may determine that the device from which a request to remove user profiles is received is trusted by receiving authentication data from the device. For instance, the user may use the device to access an application on the device and/or frontend interface hosted by the server and log into an account using authentication data, such as a username and password. The user may then provide an indication that the selected specific user device has been lost.

In an embodiment, the server may remove all of the user's profiles on the specific user device (1004). In some embodiments, the server may remove the profiles by transmitting a command to the application running on the lost device. The application operating on the lost device may then remove the user profile data from the device.

The server may notify the user regarding whether the user's profiles were successfully removed (1006). If all of the user's profiles were successfully removed, then the process ends (1016). In this instance, the keys may be considered still secure, and no key change may be instituted. In some embodiments, a key change command may still be transmitted even if all the profiles are successfully removed. For instance, in some embodiments, changing the profiles/keys may be a default response even if removing the profiles from the lost device is successful.

In some embodiments, the operation to remove the profiles from the lost device may not be successful. For instance, the phone may not be online (e.g., may be turned off, may have a network connection disabled or be in a location without network access, etc.). In an embodiment, in response to removing of all user profiles being unsuccessful, the server generates and transmits a key change command for each user profile on the specific mobile device that was not successfully removed to all trusted devices containing lock identifiers associated with the user profiles that were not successfully removed (1010). The key change command includes a new lock key to be associated with the lock encrypted using the original lock key by the server. Because a lost or stolen mobile device may be used to gain access to a lock and affect all trusted users of the lock, in some embodiments, each trusted user may have the ability to effect the key change through trusted devices. In an embodiment, when a trusted device visits a lock, the process of interacting with a lock (e.g. process 900) occurs and the key change command is received, validated, and initiated by the lock. In some embodiments, how quickly the key changes occur within the locks may be a factor of how concerned the user is and the geographic distribution of the locks. A user may visit all locks as soon as possible to remove the threat of someone using an old phone, or it could be done over time as the locks are visited in normal use. The ability to send key change commands to other users allows for someone else to visit the lock and change the lock key on behalf of the user. In some embodiments, the key change commands may be transmitted directly to the locks (e.g., using a wireless transceiver in the locks). In an embodiment, the server confirms successful storing of the new lock key in the lock (1012). In an embodiment, the server transmits to trusted devices updated user profiles (1014). The updated user profiles may be authenticated and encrypted by the server using the new lock key, and the updated user profile may include a new user key.

Figure 11:
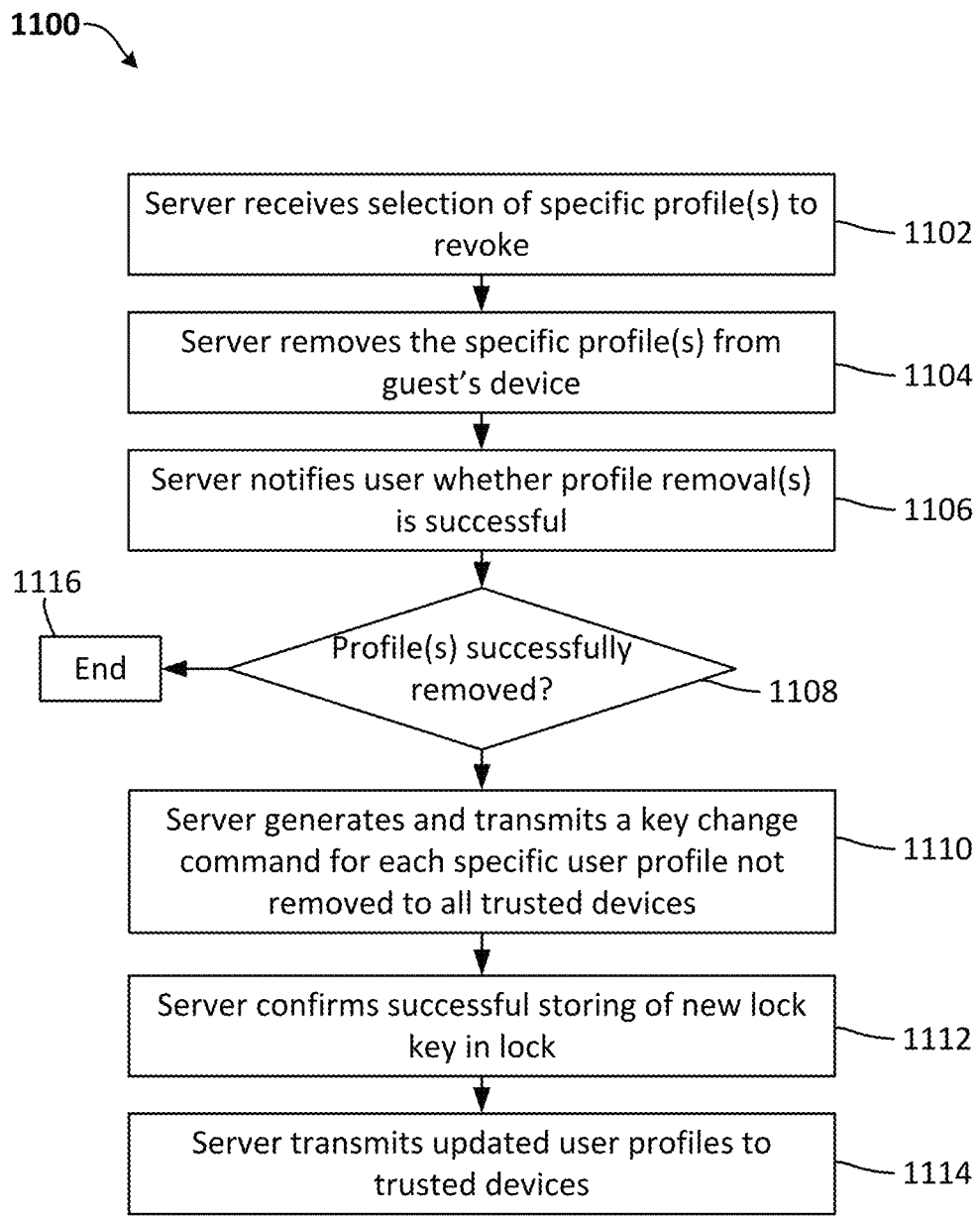
FIG. 11 is a flow diagram of a process for removing guest user profiles from a guest user's device, according to an embodiment.

Referring to FIG. 11, a flow diagram 1100 of an illustrative process for removing guest user profiles from a guest user's device is shown, according to an embodiment. In alternative embodiments, fewer, additional, and/or different steps may be performed. Also, the use of a flow diagram is not meant to be limiting with respect to the order of steps performed. A process of removing specific user profiles of a guest user may be used, for example, to revoke access to locks previously granted to the guest by the user.

In an embodiment, the server receives a selection of one or more specific user profiles of a guest user to revoke from the mobile device of the user (1102). In some embodiments, before receiving the selection, the mobile device may first be authenticated (e.g., by receiving authentication credentials from the user, such as a username and password). In an embodiment, the server may remove the one or more specific user profiles from a mobile device of the guest user (1104). In some embodiments, the server may remove the one or more specific user profiles from all mobile devices of the guest user.

In an embodiment, the server may notify the user regarding whether the specific user profiles were successfully removed (1106). If all of the user's profiles were successfully removed, then the process ends (1016). In some embodiments, a key change command may still be transmitted even if all the profiles are successfully removed.

In some embodiments, the removal of the user profiles may be unsuccessful (e.g., due to a guest device being offline or otherwise unreachable). In an embodiment, in response to removing of all user profiles being unsuccessful, the server generates and transmits a key change command for each specific user profile on the mobile device of the guest user that was not successfully removed to all trusted devices containing lock identifiers associated with those specific user profiles that were not successfully removed (1010). The key change command includes a new lock key to be associated with the lock encrypted using the original lock key by the server. Because a guest user may still gain access to a lock and affect all trusted users of the lock if a specific user profile is not removed, in some embodiments, each trusted user may have the ability to effect the key change through trusted devices. In an embodiment, when a trusted device visits a lock, the process of interacting with a lock (e.g., process 900) occurs and the key change command is received, validated, and initiated by the lock. In an embodiment, the server confirms successful storing of the new lock key in the lock (1112). In an embodiment, the server transmits to trusted devices updated user profile, where the updated user profile is authenticated and encrypted by the server using the new lock key and where the updated user profile comprises a new user key (1114).

In some embodiments, instead of, or in addition to, using key changes to revoke profiles from a guest device, a blacklist may be utilized. For instance, a unique and/or persistent identifier of one or more guest devices for which access is to be revoked may be added to a blacklist of prohibited devices and stored within the lock(s). Such a method may allow access control without redistributing new keys/user profiles. However, in some instances, if a guest user is actively trying to avoid access being revoked, the user may keep the guest device offline and attempt to retrieve the key. In such instances, it may be more secure to replace the keys and user profiles. In some embodiments, a blacklist may be utilized in combination with a key change procedure to provide an extra layer of security.

Figure 12:
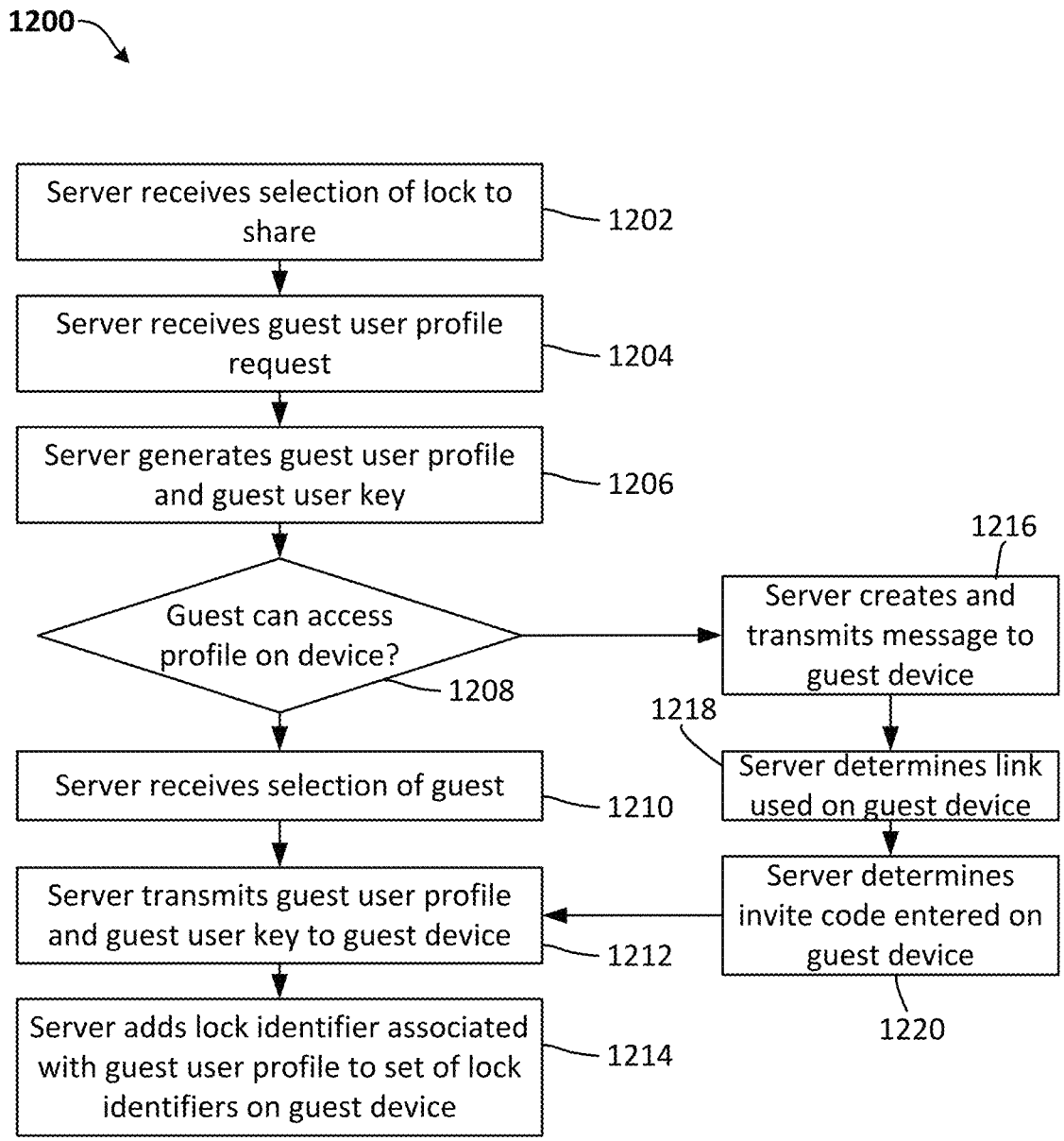
FIG. 12 is a flow diagram of a process for granting a guest user access to a lock, according to an embodiment.

Referring to FIG. 12, a flow diagram 1200 of an illustrative process for granting a guest user access to a lock is shown, according to an embodiment. In alternative embodiments, fewer, additional, and/or different steps may be performed. Also, the use of a flow diagram is not meant to be limiting with respect to the order of steps performed.

In an embodiment, the server receives, from the mobile device of the user, a selection of one or more lock identifiers associated with the one or more locks to share with the guest user from set of lock identifiers stored on the mobile device of the user (1202). In some embodiments, the selection may be from a lock list associated with one or more user profiles of the user granting the access.

In an embodiment, the server receives a guest user profile request from the mobile device of the user (1204). In some embodiments, the guest user profile request may be configured, and configuring the guest profile request may include modifying guest user schedule data that defines when the lock may be accessed by the guest, revocation data that sets an expiration time of the guest user profile, where upon expiration the guest user profile is invalid, and/or an indication of whether a time kept by the mobile device is trusted. In some embodiments, one or more of these characteristics and/or other characteristics of the guest profile may be configurable by the user granting guest access.

In an embodiment, the server generates an authenticated and encrypted guest user profile based on the guest user profile request and a guest user key (1206). In some embodiments, the authenticated and encrypted guest user profile is encrypted using a lock key associated with the lock to be shared, and the authenticated and encrypted guest user profile includes the guest user key. In some embodiments, the guest user key is stored both inside the guest user profile and in a manner readable by the mobile device. The guest user key is uniquely generated for each individual guest user. This prevents a guest user from using another user's key.

The server may determine whether the mobile device of the guest user can access the guest user profile (1208). In some embodiments, the server may determine whether the guest user is a registered user and/or has the application used for interfacing with locks installed on the guest user's mobile device.

In an embodiment, when the server determines the mobile device of the guest user can access the guest user profile (e.g., the guest user is a registered user and/or the guest user mobile device has the application installed), the server receives from the mobile device of the user a selection of the guest user (e.g., from a set of registered users) on the mobile device of the user granting guest access (1210). In some embodiments, the selection of the guest user may be from a search on the mobile device for the guest user. In an embodiment, the server transmits the guest user profile and the guest user key to the mobile device of the guest user after receiving the selection (1212). In an embodiment, the server adds the lock identifier associated with the guest user profile to the set of lock identifiers on the mobile device of the guest user (1214).

In an embodiment, when the server determines the mobile device of the guest user cannot access the guest user profile (e.g., the guest user is not a registered user and/or no application is installed on the guest user's mobile device), the server generates and transmits a message to the mobile device of the guest user (1216). In some embodiments, the message may include a code used to allow access to the lock key(s) and/or a link to a authentication resource (e.g., webpage) through which the guest user may enter the code and/or download the application and/or the guest profile. In some embodiments, this message may be an email or SMS/text. In some embodiments, the link may an activation link. In some embodiments, the code may be an invitation code or an authorization code.

In an embodiment, the server determines the link has been used to allow access to user profiles on the mobile device of the guest user (1218). In some embodiments, the link may allow the guest user to download the application to the mobile device, and the user may enter registration information to create a new guest account on the linked resource and/or through the downloaded application. In some embodiments, the server determines the mobile device of the guest user can now access user profiles. In an embodiment, the server determines the code has been entered on the mobile device of the guest user (1220). In an embodiment, the server transmits the guest user profile and the guest user key to the mobile device of the guest user (1212). In an embodiment, the server adds the lock identifier associated with the guest user profile to the set of lock identifiers on the mobile device of the guest user (1214).

Figure 13:
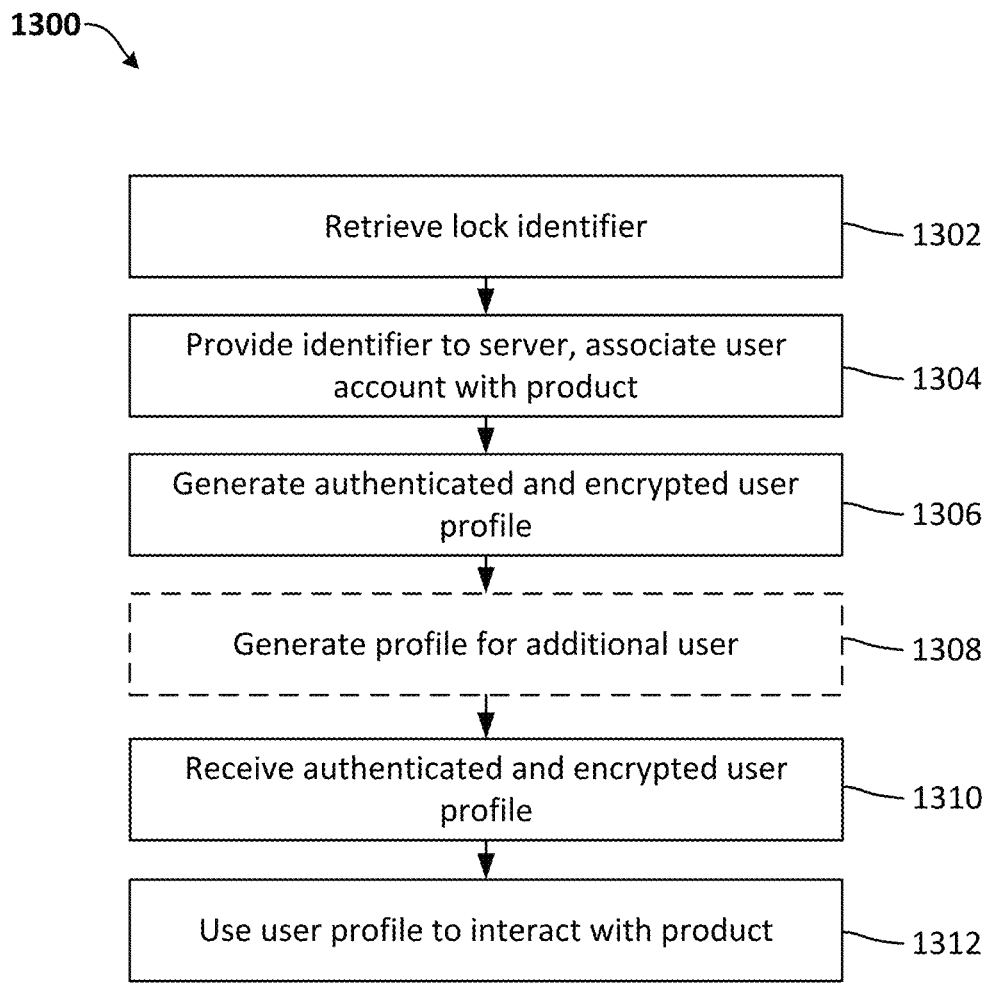
FIG. 13 is a flow diagram of a process for configuring a product and user device, according to another embodiment.

Referring to FIG. 13, a flow diagram of an illustrative process 1300 for configuring a product and user device is shown, according to an embodiment. In alternative embodiments, fewer, additional, and/or different steps may be performed. Also, the use of a flow diagram is not meant to be limiting with respect to the order of steps performed.

The lock identifier is retrieved (1302). For example, the user may refer to included product packaging to retrieve the lock identifier, or the user may otherwise contact a manufacturer to receive the lock identifier (e.g., via a manufacturer website, phone, etc.). If the user is a registered user, the user may open and/or log into the application on the mobile device of the user before retrieving and/or entering the lock identifier. If the user is not registered, the user may create a new account and register it with a management server. In some embodiments, the user may download an application to the mobile device of the user and create the account through the application. In some embodiments, the user may create the account through a frontend interface provided to the mobile device from the server (e.g., through a browser application on the mobile device).

The lock identifier is then provided to the management server (1304) in order to associate the lock with the user. For example, a user may enter the lock identifier on a user interface of an application running on the mobile device, which then transmits the lock identifier to the server. In one such example, the user may enter the lock identifier within a frontend interface provided by the management server and accessed via a browser application on the mobile device. Alternatively, the user may use the mobile device to scan packaging of lock to retrieve and transmit the lock identifier. For example, the lock identifier may be encoded by a barcode, QR code, optical code, etc., and a camera of the mobile device may be used to scan and determine the unique code. In response to receiving the lock identifier from the mobile device, the server can retrieve or newly generate (e.g., on demand) the lock key and user key, which may then be associated with the lock identifier. In some embodiments, the server may verify that the lock identifier (e.g., product code) is valid, for example, by comparing the lock identifier to a set of identifiers known to be valid identifiers.

The server may then generate a user profile (1306), which may also be associated with the lock identifier. If a user profile does not yet exist, default values, or values provided by the user via the mobile device may be used to generate the new profile. For example, the user may enter profile data into an application of the mobile device, which transmits the profile data to the server along with the lock identifier. If the user has already created a profile, the server may instead update the user profile with new values provided by the user via the mobile device.

In general, a user profile may include one or more files that include data related to operation of the product, which is the lock in the above embodiment. For example, a user profile may contain a user schedule of when the lock may be accessed (unlocked, locked, etc.). The schedule may specify lock access permissions, e.g., by day of the week, including starting times (hours, minutes, etc.) and ending times (hours, minutes, etc.) for each corresponding permission. For example, a schedule may specify the time spans in which an electronic lock may be unlocked via the mobile device. As another example, the schedule may specify time periods in which typical interactions are expected to occur, and a level of trust may be determined based on these time periods. Accordingly, an unlock request sent within an expected time period may be more trusted by the lock than a request sent at an unexpected/atypical time. The mobile device may also automatically adjust a schedule. For example, the mobile device may log/record a user's interactions with the lock, and may set a schedule based around the user's anticipated actions. In one embodiment, a default user schedule is set (e.g., by the manufacturer, etc.). Additionally, a list of typical user schedules may also be provided to allow a user to select from one of many configuration options. In this manner, a manufacturer may provide various recommended operational settings to a user. A user may also customize a schedule to tailor the schedule as he or she desires.

A user profile may further specify a model/serial number of the lock and what types of accesses are available for that user. For example, such accesses may include: reading software/hardware version information of the lock, updating software of the lock, reading a shackle state of the lock, locking, unlocking, disarming, reading/setting a time/clock value, reading a battery level, reading/clearing event related data (e.g., flags, counters, etc.), reading a log of the lock, reading/setting/resetting a keypad code of the lock, reading communications data for the lock (e.g., transmission statuses, transmission power levels, channel information, addressing information, etc.), reading/setting default values stored for the lock (e.g., default disarm times, default unlock times, etc.), among others. A user profile may also specify a start time and a revocation date/time for the profile (i.e., when the profile begins to be valid and when the profile expires and is no longer valid). A user profile may provide maximum disarm/unlock times for the lock. A user profile may also provide an indication of a trust level of a corresponding mobile device (e.g., whether a time value/timestamp provided by the mobile device is trusted or not). The lock may be configured to allow or disallow certain functionality based on the trust level of a device. The trust level may be stored as an independent permission that the user may or may not have access to (e.g., the trust level may be managed/adjusted by the software of the lock, mobile device, or server, etc.). As an example, only a highly trusted device may be able to upgrade the firmware of the lock or change certain settings. Additionally, the lock may have a security algorithm that factors in a trust level and time value. For example, as a device successfully interacts with the lock more often, the lock may increase (or adjust) a trust level for the device. However, if a time value is out of sync with the lock's maintained time or authentication fails, the lock may decrease (or adjust) a trust level for the device. The time value provided by the mobile device may be compared to a time value maintained by the lock, and a degree of closeness between the two times may be used to indicate a trust level for the device (e.g., the closer the two times are to being in sync, the higher the trust level, etc.). If a trust level decreases below a certain threshold, the lock may discontinue or limit interactions with the mobile device. A trust level may also be based on the schedule discussed above. For example, a mobile device may be regarded as more or less trusted based on the time the device is accessing the lock, and whether that time falls within certain time periods as defined by the schedule. The time value provided by the mobile device may also be used to sync the clock of the lock with that of the mobile device, or may be used otherwise during authenticated communications. Any of the profile items discussed may have default values (e.g., manufacturer defaults) or user provided values. A profile is not limited to the above data, and additional data may be included. A profile may also be stored on a server for later retrieval.

In addition to generating a profile for the user (e.g., the owner of the lock), the user may desire to create additional guest profiles (1308) to be shared with friends, family, co-workers, etc. In this manner, a user may grant another person access to the lock, based on the guest profiles. To do so, a user may enter in desired profile values (using the mobile device) for the additional person(s). Similar to the creation of the user's profile, the guest profile data may be transmitted to the server to be processed as discussed above in relation to FIG. 12. The guest profile data may be transmitted to the server simultaneously or separately (e.g., at a later time) from when the user initially generates his or her profile. The mobile device includes information that differentiates the types of profiles (e.g., owner vs. guest) being provided to the server.

After at least one profile is generated, the user is associated with the particular lock as an owner of the lock. In some embodiments, the association may be based solely on the lock identifier that was provided to the server (e.g., in step 1304). In one embodiment, after providing a lock identifier, the mobile device may use the lock identifier to automatically retrieve additional information related to the lock (e.g., a serial ID, a model number, etc.) from a database or a server of the lock's manufacturer. In alternative embodiments, a serial ID, a model number, or other code may also be provided by a user (e.g., by referring to product packaging, etc.), and such additional data may be utilized, along with the lock identifier, in associating a user with a lock. In some embodiments, additional authentication of a user may also be required prior to associating a user with a lock as an owner, and such authentication may be provided via the mobile device.

In some embodiments, the management server may verify received profile data. To verify the received profile data, the management server may perform a cyclic redundancy check (CRC) on the profile to ensure the data's integrity. Other data verification methods may also be utilized. For example, in an illustrative embodiment, a message authentication code (MAC) (e.g., a keyed-hash message authentication code (HMAC)) may be generated using the lock key and used for verification of data integrity. The scope of the present disclosed is not limited to a certain data integrity validation mechanism. The sever can then authenticate and encrypt the profile data using the lock key in order to transform the profile data into an authenticated and encrypted user profile (e.g., ciphertext). The profile may be encrypted according to any known encryption standards. The user profile also includes the corresponding user key. The user key can be determined by the server using the lock identifier (e.g., as discussed in steps 1302-1304).

After encryption, the encrypted profile is transmitted from a server to the mobile device (1310). The received encrypted profile and user key are then stored in a memory of the mobile device in order to complete the association of the mobile device with the lock. The user may then use his or her mobile device to interact with the lock (1312). In some embodiments, the user may use the application on the mobile device to customize the lock entry. For instance, the user may select a lock profile and edit the configuration to provide customized information such as, but not limited to, lock name, description, GPS coordinates, picture, allowed guest users, etc.

Figure 14:
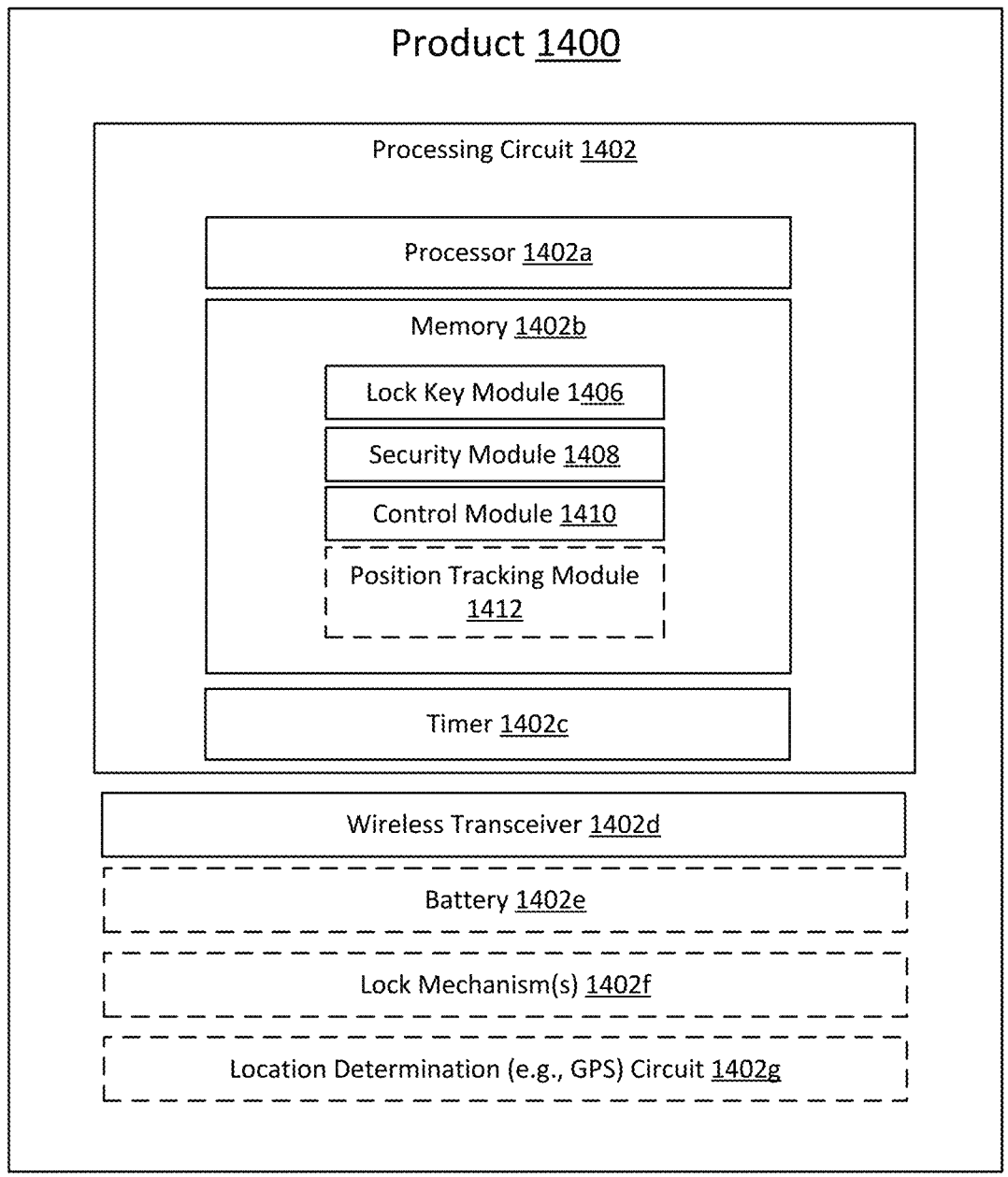
FIG. 14 is a block diagram of a product for implementing the techniques disclosed herein, according to another embodiment.

Referring to FIG. 14, a block diagram of a product 1400 for implementing the techniques disclosed herein is shown, according to another embodiment. For example, product 1400 may be a lock as discussed herein. In general, product 1400 includes a processing circuit 1402, which may include a processor 1402a, a memory 1402b, and a timer 1402c (which may include the clock components of processor 1402a, for maintaining a product time to be used as described herein). Processor 1402a may be any commercially available processor or any of the processors discussed herein (e.g., processor(s) 402, etc.). In an embodiment, processor 1402a may be configured to store a lock identifier and a lock key in the memory, broadcast the lock identifier via the transceiver, receive an encrypted user profile from a mobile device via the transceiver, authenticate and decrypt the encrypted user profile using the lock key, transmit a security code to the mobile device via the transceiver, receive an encrypted command from the mobile device via the transceiver, validate the encrypted command, wherein validating the encrypted command includes: decrypting the encrypted command using the user key from the decrypted user profile; determining whether the security code is valid; and authenticating the decrypted command using the user key; and initiating, in response to validating the command, an action of the electronic locking device as specified by the command. In some embodiments, the security code may be a sequence number. In some embodiments, the security code may be valid for a limited time.

Memory 1402b includes any of the memory and/or storage components discussed herein. For example, memory 1402b may include RAM and/or cache of processor 1402a. Memory 1402b may also include one or more storage devices (e.g., hard drives, flash drives, computer readable media, etc.). Memory 1402b includes various software modules configured to implement the techniques disclosed herein with respect to products (e.g., electronic locking devices, etc.). For example memory 1402b may include a lock key module 1406, a security module 1408, and a control module 1410. The lock key module 1406 is configured to store the product's corresponding lock key. In some embodiments, a product 1400 performing the process of 1300, for instance, where the user key is part of the user profile, there is no need to separately store user keys. Other modules of memory 1402b may interact with lock key module 1406. For example, security module 1408 may access lock key module 1408 to retrieve a lock key to decrypt an encrypted user profile received from a user device. Control module 1410 contains the software configured to interact with the other modules of memory 1402b to implement the techniques disclosed herein with respect to a product. For example, in an embodiment where product 1400 is a lock, after being awoken, control module 1410 may attempt to pair/communicate with a user device (via wireless transceiver 1402d). Control module 1410 may also include operating system (e.g., an embedded operating system, firmware, etc.) software for product 1400. As another example, control module 1410 may request security module 1408 to access a user profile and command to determine an action to be taken. Based on the permissions of the user profile and the command, control module 1410 may determine whether or not to take a command action. For example, control module 1410 may generate the signals necessary to control mechanical (and electronic) components of product 1400 (e.g., lock mechanisms 1402f) in response to a request (e.g., an unlock request for a lock, etc.). As another example, control module 1410 may interface with lock mechanisms 1402*f* to control a user's physical interactions with a lock (e.g., control module 1410 may receive input from a dial interface, a key code interface, buttons, touch interface, etc.) in order to unlock a shackle of the lock.

In some embodiments, product 1400 may include a location determination circuit 1402*g*, such as a Global Positioning System (GPS) device/receiver, that may determine one or more locations of product 1400 at one or more times. In some such embodiments, memory 1402*b* may include a position tracking module 712 configured to receive the location data from location determination circuit 1402*g* and store data indicative of the location or position of product 1400 at one or more times.

Wireless transceiver 1402*d* includes communications hardware (e.g., Bluetooth components, radiofrequency components, NFC components, ZigBee components, RFID components, Wi-Fi components, etc.) for wirelessly communication with another device (e.g., user devices 500, servers 600, etc.). In some embodiment, product 1400 includes a battery 1402*c* for providing power to the product. In an embodiment where product 1400 is a lock, lock mechanism(s) 1402*f* includes one or more physical and/or electronic locking mechanisms (e.g., pins, shackles, dials, buttons, shafts, keyholes, etc.) as discussed herein. For example, lock mechanism(s) 1402*f* may correspond to lock mechanisms 106*g*.

Figure 15A:
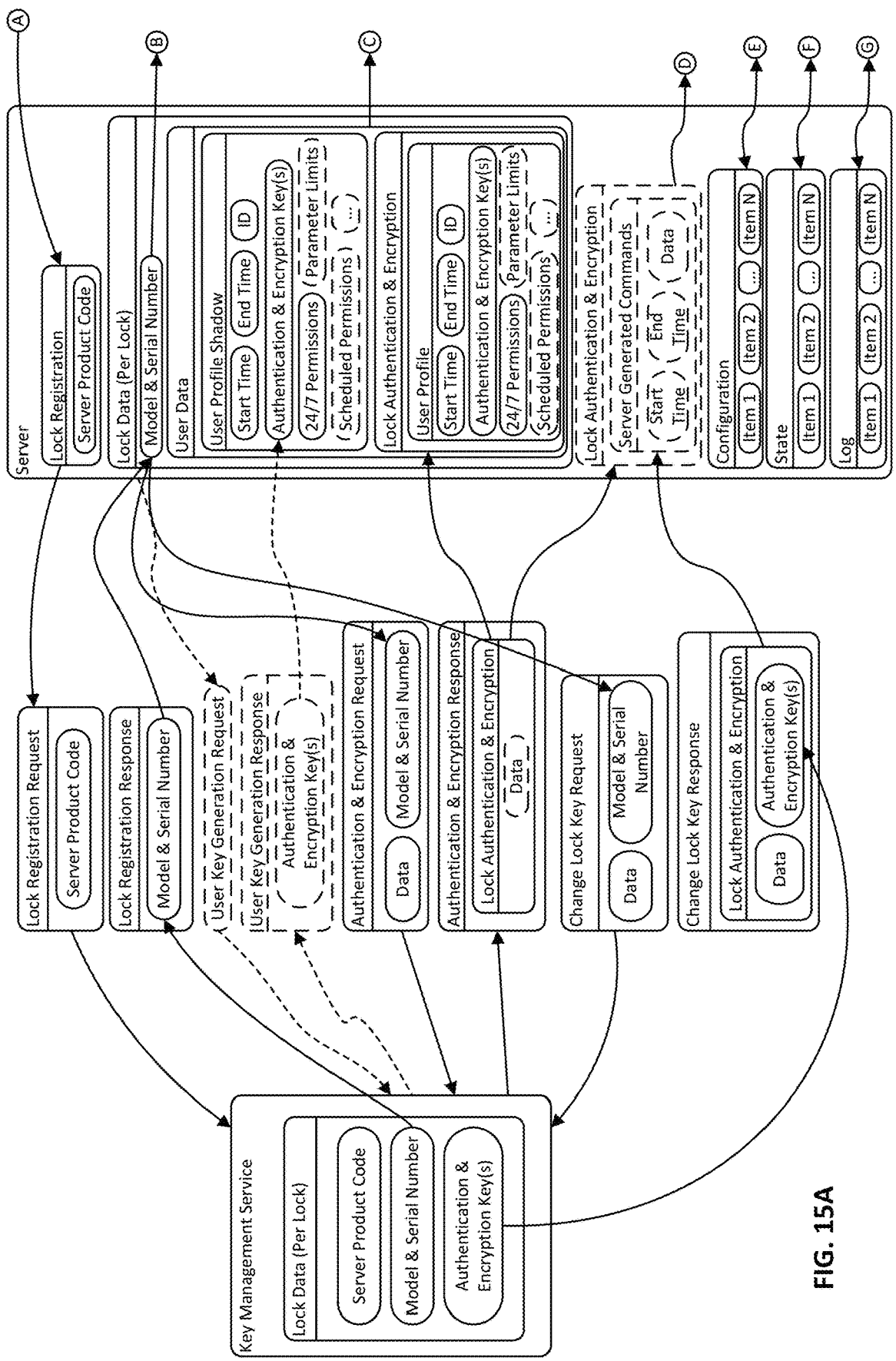
FIG. 15 is a data flow diagram of a data flow process for interacting with a product with a user device, according to an embodiment.

Referring to FIG. 15, a data flow diagram of an illustrative data flow process for interacting with a product with a user device is shown, according to an embodiment. FIG. 15 is separated into a first portion FIG. 15A and a second portion FIG. 15B for purposes of readability. The illustrated data flow diagram illustrates a flow of data that may be utilized to accomplish secure communication between a server, mobile application, and lock for the purposes of performing one or more of the functions discussed above (e.g., with respect to FIGS. 9 through 14), according to one exemplary embodiment.

Reference in this specification to "one embodiment," "some embodiments," or "an embodiment" means that a particular feature, structure, or characteristic described in connection with the embodiment is included in at least one embodiment. The appearance of the phrase "in one embodiment" or "in some embodiments" in various places in the specification is not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The disclosure is described above with reference to drawings. These drawings illustrate certain details of specific embodiments that implement the systems and methods and programs of the present disclosure. However, describing the disclosure with drawings should not be construed as imposing on the disclosure any limitations that may be present in the drawings. The present disclosure contemplates methods, systems and program products on any machine-readable media for accomplishing its operations. The embodiments of the present disclosure may be implemented using an existing computer processor, or by a special purpose computer processor incorporated for this or another purpose or by a hardwired system. No claim element herein is to be construed under the provisions of 35 U.S.C. § 112, sixth paragraph, unless the element is expressly recited using the phrase "means for." Furthermore, no element, component or method step in the present disclosure is intended to be dedicated to the public, regardless of whether the element, component or method step is explicitly recited in the claims.

Embodiments within the scope of the present disclosure include program products comprising machine-readable storage media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EEPROM, CD ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions comprise, for example, instructions and data which cause a general purpose computer, special purpose computer, or special purpose processing machine to perform a certain function or group of functions. While a computer or machine-readable storage medium is not a propagated signal (i.e., is tangible and non-transitory), a computer or machine-readable storage medium can be a source or destination of computer program instructions encoded in an artificially-generated and propagated signal.

Embodiments of the disclosure are described in the general context of method steps which may be implemented in one embodiment by a program product including machine-executable instructions, such as program code, for example, in the form of program modules executed by machines in networked environments. Generally, program modules include routines, programs, objects, components, data structures, etc., that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

Embodiments of the present disclosure may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art will appreciate that such network computing environments will typically encompass many types of computer system configurations, including personal computers, hand-held devices, mobile phones, multi-processor systems, microprocessor-based or programmable consumer electronics, network PCs, servers, minicomputers, mainframe computers, and the like. Embodiments of the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the disclosure might include a general purpose computing device in the form of a computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD-ROM or other optical media. The drives and their associated machine-readable media provide nonvolatile storage of machine-executable instructions, data structures, program modules, and other data for the computer.

It should be noted that although the flowcharts provided herein show a specific order of method steps, it is understood that the order of these steps may differ from what is depicted. Also, two or more steps may be performed concurrently or with partial concurrence. Such variation will depend on the software and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments of the disclosure have been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated.

The invention claimed is:

1. A method for monitoring locations of a plurality of portable locks, the method comprising:
    acquiring, by one or more processing circuits, location information regarding a plurality of locations of the plurality of portable locks, wherein a respective location of the plurality of locations is determined during a respective interaction between a respective portable lock of the plurality of portable locks and a respective user device, and wherein the respective location of the respective portable lock is a last known location of the respective portable lock during the respective interaction between the respective portable lock and the respective user device, and not a real-time location of the respective portable lock following the respective interaction;
    acquiring, by the one or more processing circuits, one or more parameters; and
    generating, by the one or more processing circuits, a mapping interface displaying one or more of the plurality of the locations of the plurality of portable locks based on the one or more parameters, wherein the one or more of the plurality of locations include the respective location of the respective portable lock from the respective interaction when the respective location fulfills the one or more parameters, and wherein the one or more of the plurality of locations do not include locations that do not fulfill the one or more parameters.

2. The method of claim 1, further comprising:
    receiving, by one or more processing circuits, permission for a quest user to access one of the plurality of portable locks;
    determining, by the one or more processing circuits, that a location of the one of the plurality of portable locks is accessible by a guest user via a guest user device; and
    transmitting, by the one or more processing circuits, the location to the guest user device in response to determining that the location is accessible by the guest user via the quest user device.

3. The method of claim 1, further comprising:
    receiving, by one or more processing circuits, permission for a guest user to access one of the plurality of portable locks; and
    in response to determining that a location of the one of the plurality of portable locks is not accessible by the guest user via a guest user device:
        providing, by the one or more processing circuits, a notification to the guest user device;
        receiving, by the one or more processing circuits, one or more inputs from the guest user via the guest user device based on the notification, wherein the one or more inputs cause at least one of (a) an application to be to be installed on the guest user device or (b) a registered account to be created; and
        transmitting, by the one or more processing circuits, the location to the guest user device.

4. A system for monitoring locations of a plurality of portable locks, the system comprising:
    a non-transitory computer-readable medium having instructions stored thereon that, when executed by one or more processors of a server, cause the one or more processors to:
        acquire location information regarding a plurality of locations of the plurality of portable locks, wherein a respective location of the plurality of locations is determined during a respective interaction between a respective portable lock of the plurality of portable locks and a respective user device, and wherein the respective location of the respective portable lock is a last known location of the respective portable lock during the respective interaction between the respective portable lock and the respective user device, and not a real-time location of the respective portable lock following the respective interaction;
        acquire one or more parameters; and
        generate a mapping interface displaying one or more of the plurality of the locations of the plurality of portable locks based on the one or more parameters, wherein the one or more of the plurality of locations include the respective location of the respective portable lock from the respective interaction when the respective location fulfills the one or more parameters, and wherein the one or more of the plurality of locations do not include locations that do not fulfill the one or more parameters.

5. The system of claim 4, wherein the instructions cause the one or more processors to:

receive permission for a guest user to access one of the plurality of portable locks; and transmit a location of the one of the plurality of portable locks to a guest user device following receipt of the permission.

6. The system of claim 5, wherein the instructions cause the one or more processors to transmit a credential associated with the one of the plurality of portable locks to the guest user device following receipt of the permission.

7. The system of claim 6, wherein the instructions cause the one or more processors to determine whether the location and the credential are accessible by the guest user based on at least one of (a) the guest user device having an application associated with the system installed thereon or (b) the guest user having a registered account associated with the system.

8. The system of claim 7, wherein, in response to determining that the location and the credential are accessible by the guest user, the instructions cause the one or more processors to transmit the location and the credential to the guest user device.

9. The system of claim 7, wherein, in response to determining that the location and the credential are not accessible by the guest user, the instructions cause the one or more processors to:

provide a notification to the guest user device;

receive one or more inputs from the guest user via the guest user device based on the notification, wherein the one or more inputs cause at least one of (a) the application to be to be installed on the guest user device or (b) the registered account to be created; and transmit the location and the credential to the guest user device.

10. The system of claim 6, wherein the credential permits unlocking the one of the plurality of portable locks using wireless communication capabilities of the guest user device.

11. The system of claim 4, wherein the respective location is determined using a location tracking feature of the respective user device during the respective interaction.

12. The system of claim 4, wherein the respective location is determined using a location tracking feature of the respective portable lock during the respective interaction.

13. The system of claim 4, wherein the respective portable lock is an electronic lock.

14. The system of claim 13, wherein the electronic lock is disconnected from the server.

15. The system of claim 4, wherein the respective interaction includes wireless communications between the respective portable lock and the respective user device.

16. The system of claim 4, wherein the respective interaction includes scanning an identifier associated with the respective portable lock using a camera of the respective user device.

17. The system of claim 16, wherein the identifier includes at least one of a barcode or a QR code.

* * * * *